(12) United States Patent
Murata et al.

(10) Patent No.: US 12,462,832 B2
(45) Date of Patent: Nov. 4, 2025

(54) INFORMATION PROCESSING APPARATUS, INFORMATION PROCESSING SYSTEM, INFORMATION PROCESSING METHOD, AND NON-TRANSITORY RECORDING MEDIUM TO GENERATE SOUND DATA INCLUDING BEATS BASED ON USER BEHAVIOR INFORMATION IN A SCHEDULED CONFERENCE

(71) Applicants: Haruki Murata, Tokyo (JP); Yuuya Katoh, Kanagawa (JP)

(72) Inventors: Haruki Murata, Tokyo (JP); Yuuya Katoh, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 211 days.

(21) Appl. No.: 18/049,369

(22) Filed: Oct. 25, 2022

(65) Prior Publication Data

US 2023/0238018 A1    Jul. 27, 2023

(30) Foreign Application Priority Data

Jan. 21, 2022    (JP) .................................. 2022-007840

(51) Int. Cl.
- *G10L 25/63*    (2013.01)
- *G10K 15/02*    (2006.01)
- *G10L 21/00*    (2013.01)
- *G10L 25/84*    (2013.01)

(52) U.S. Cl.
CPC .............. *G10L 25/63* (2013.01); *G10L 21/00* (2013.01); *G10K 15/02* (2013.01)

(58) Field of Classification Search
CPC .......... G10L 25/63; G10L 25/84; G10K 15/02
See application file for complete search history.

(56) References Cited

U.S. PATENT DOCUMENTS

| | | | |
|---|---|---|---|
| 2020/0042285 A1* | 2/2020 | Choi | .................... G10L 25/84 |
| 2021/0263704 A1 | 8/2021 | Murata | |
| 2023/0352005 A1 | 11/2023 | Akahori et al. | |

FOREIGN PATENT DOCUMENTS

| | | | |
|---|---|---|---|
| JP | 2008-272019 | 11/2008 | |
| JP | 2010074199 | * 4/2010 | ............. G10K 15/02 |
| JP | 2017-201479 | 11/2017 | |
| JP | 2018-512607 | 5/2018 | |
| JP | 2020-065097 | 4/2020 | |
| WO | WO2016/130228 A1 | 8/2016 | |
| WO | 2021/171606 | 9/2021 | |

OTHER PUBLICATIONS

Japanese Office Action for 2022-007840 mailed on Sep. 9, 2025.

* cited by examiner

*Primary Examiner* — Farzad Kazeminezhad
(74) *Attorney, Agent, or Firm* — IPUSA, PLLC

(57) ABSTRACT

An information processing apparatus includes circuitry to acquire behavior information of a plurality of users having a conversation, generate sound data based on the behavior information, and cause an output device to output an ambient sound based on the sound data, wherein the sound data is generated by combining a number of sounds, a number of beats and a tone based on the behavior information.

17 Claims, 19 Drawing Sheets

| BEAT LEVEL | FREQUENCY OF POSTURE CHANGES | THE NUMBER OF BEATS | ... |
|---|---|---|---|
| L1 | LESS THAN 10 TIMES IN LAST 60 SECONDS | MINIMUM | ... |
| L2 | EQUAL TO OR MORE THAN 10 TIMES AND LESS THAN 17 TIMES IN LAST 60 SECONDS | MEDIUM | ... |
| L3 | EQUAL TO OR MORE THAN 17 TIMES AND LESS THAN 25 TIMES IN LAST 60 SECONDS | HIGH | ... |
| L4 | MORE THAN 25 TIMES IN LAST 60 SECONDS | MAXIMUM | ... |

FIG. 6

| RESERVATION ID | ROOM ID | RESERVED TIME | PARTICIPATING USER | ... |
|---|---|---|---|---|
| R001 | room001 | 2022/01/12 13:00-14:00 | USER 1, USER 2, USER 3, USER 4 | ... |
| R002 | room001 | 2022/01/13 10:00-12:00 | USER 1, USER 3, USER 4 | ... |
| R003 | room100 | 2022/01/12 13:00-13:30 | USER 5, USER 6, USER 7, USER 8, USER 9 | ... |
| ... | ... | ... | ... | ... |

FIG. 7

| RESERVATION ID | TIME ZONE A | ASSIGNED SOUND SOURCE FOR TIME ZONE A | TIME ZONE B | ASSIGNED SOUND SOURCE FOR TIME ZONE B | TIME ZONE C | ASSIGNED SOUND SOURCE FOR TIME ZONE C | TIME ZONE D | ASSIGNED SOUND SOURCE FOR TIME ZONE D | ... |
|---|---|---|---|---|---|---|---|---|---|
| R001 | 13:00-13:10 | SOUND SOURCE SET a | 13:10-13:30 | SOUND SOURCE SET b | 13:30-13:50 | SOUND SOURCE SET c | 13:50-14:00 | SOUND SOURCE SET d | ... |
| R002 | 10:00-10:20 | SOUND SOURCE SET a | 10:20-11:00 | SOUND SOURCE SET b | 11:00-11:40 | SOUND SOURCE SET c | 11:40-12:00 | SOUND SOURCE SET d | ... |
| R003 | 13:00-13:05 | SOUND SOURCE SET w | 13:05-13:15 | SOUND SOURCE SET x | 13:15-13:25 | SOUND SOURCE SET y | 13:25-13:30 | SOUND SOURCE SET z | ... |
| ... | ... | ... | ... | ... | ... | ... | ... | ... | ... |

FIG. 8

| SOUND COUNT LEVEL | SPEECH UTTERANCE AMOUNT | THE NUMBER OF SOUNDS |
|---|---|---|
| L1 | LESS THAN 20 SECONDS IN LAST 60 SECONDS | 1 |
| L2 | EQUAL TO OR MORE THAN 20 SECONDS AND LESS THAN 35 SECONDS IN LAST 60 SECONDS | 2 |
| L3 | EQUAL TO OR MORE THAN 35 SECONDS AND LESS THAN 50 SECONDS IN LAST 60 SECONDS | 3 |
| L4 | MORE THAN 50 SECONDS IN LAST 60 SECONDS | 4 |
| ... | ... | ... |

FIG. 9

| BEAT LEVEL | FREQUENCY OF SPEAKER CHANGES | THE NUMBER OF BEATS | ... |
|---|---|---|---|
| L1 | LESS THAN 10 TIMES IN LAST 60 SECONDS | MINIMUM | ... |
| L2 | EQUAL TO OR MORE THAN 10 TIMES AND LESS THAN 17 TIMES IN LAST 60 SECONDS | MEDIUM | ... |
| L3 | EQUAL TO OR MORE THAN 17 TIMES AND LESS THAN 25 TIMES IN LAST 60 SECONDS | HIGH | ... |
| L4 | MORE THAN 25 TIMES IN LAST 60 SECONDS | MAXIMUM | ... |

FIG. 10

| TONE LEVEL | WEATHER INFORMATION | TONE | ... |
|---|---|---|---|
| L1 | SUNNY | TONE a | ... |
| L2 | CLOUDY | TONE b | ... |
| L3 | RAINY | TONE c | ... |
| ... | ... | ... | ... |

FIG. 11

| PARTICIPATING USER | MELODY | ... |
|---|---|---|
| USER 1 | MELODY w | ... |
| USER 2 | MELODY x | ... |
| USER 3 | MELODY y | ... |
| USER 4 | MELODY z | ... |
| ... | ... | ... |

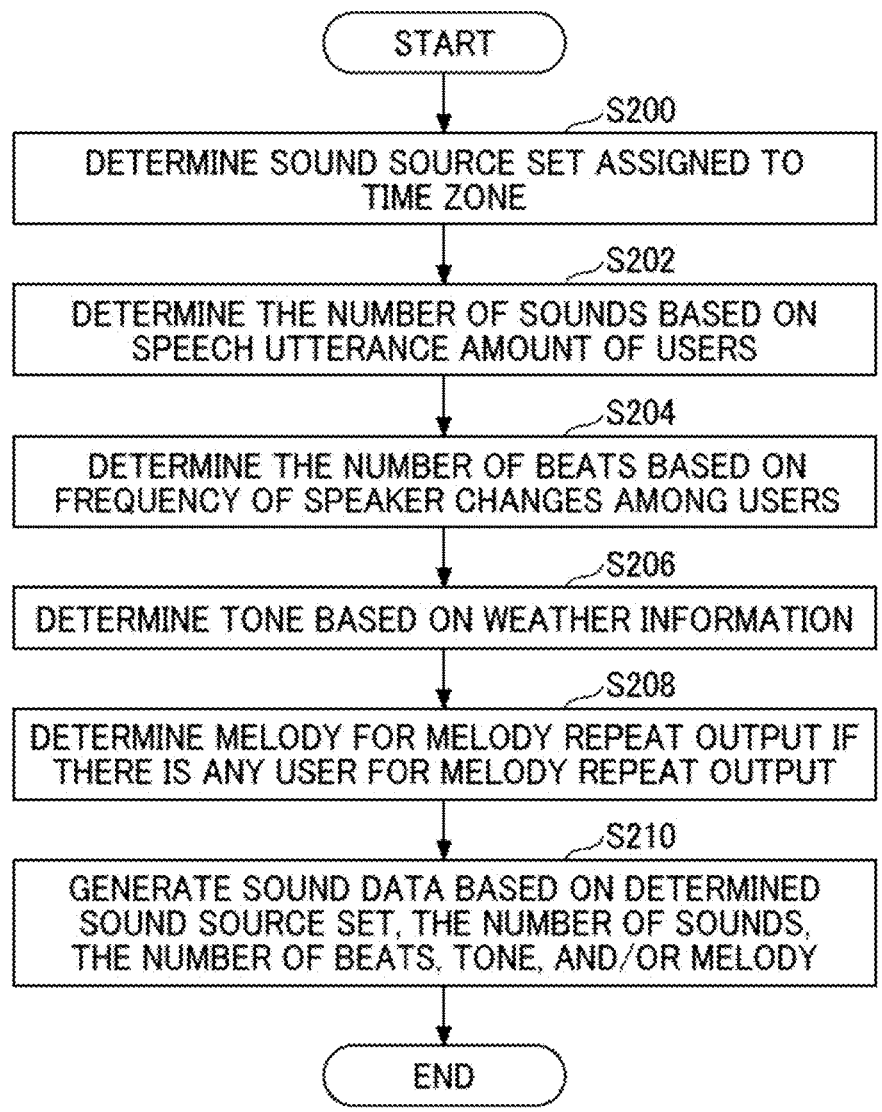

FIG. 14

| SOUND COUNT LEVEL | POSTURE INFORMATION | THE NUMBER OF SOUNDS | |
|---|---|---|---|
| L1 | POSTURE CHANGE AMOUNT IN LAST 60 SECONDS IS EQUAL TO OR MORE THAN 10 $cm^3$ AND LESS THAN 15 $cm^3$ | 1 | ⋮ |
| L2 | POSTURE CHANGE AMOUNT IN LAST 60 SECONDS IS EQUAL TO OR MORE THAN 15 $cm^3$ AND LESS THAN 35 $cm^3$ | 2 | ⋮ |
| L3 | POSTURE CHANGE AMOUNT IN LAST 60 SECONDS IS EQUAL TO OR MORE THAN 35 $cm^3$ AND LESS THAN 50 $cm^3$ | 3 | ⋮ |
| L4 | POSTURE CHANGE AMOUNT IN LAST 60 SECONDS IS MORE THAN 50 $cm^3$ | 4 | ⋮ |

FIG. 15

| BEAT LEVEL | FREQUENCY OF POSTURE CHANGES | THE NUMBER OF BEATS | ... |
|---|---|---|---|
| L1 | LESS THAN 10 TIMES IN LAST 60 SECONDS | MINIMUM | ... |
| L2 | EQUAL TO OR MORE THAN 10 TIMES AND LESS THAN 17 TIMES IN LAST 60 SECONDS | MEDIUM | ... |
| L3 | EQUAL TO OR MORE THAN 17 TIMES AND LESS THAN 25 TIMES IN LAST 60 SECONDS | HIGH | ... |
| L4 | MORE THAN 25 TIMES IN LAST 60 SECONDS | MAXIMUM | ... |

FIG. 16

| TONE LEVEL | TEMPERATURE INFORMATION | TONE | ... |
|---|---|---|---|
| L1 | LOW | TONE a | ... |
| L2 | ORDINARY | TONE b | ... |
| L3 | HIGH | TONE c | ... |
| ... | ... | ... | ... |

FIG. 20

| TONE LEVEL | SCREEN CHANGE AMOUNT | TONE | ... |
|---|---|---|---|
| L1 | LESS THAN 5 TIMES IN LAST 60 SECONDS | TONE a | ... |
| L2 | EQUAL TO OR MORE THAN 5 TIMES AND LESS THAN 10 TIMES IN LAST 60 SECONDS | TONE b | ... |
| L3 | MORE THAN 10 TIMES IN LAST 60 SECONDS | TONE c | ... |
| ... | ... | ... | ... |

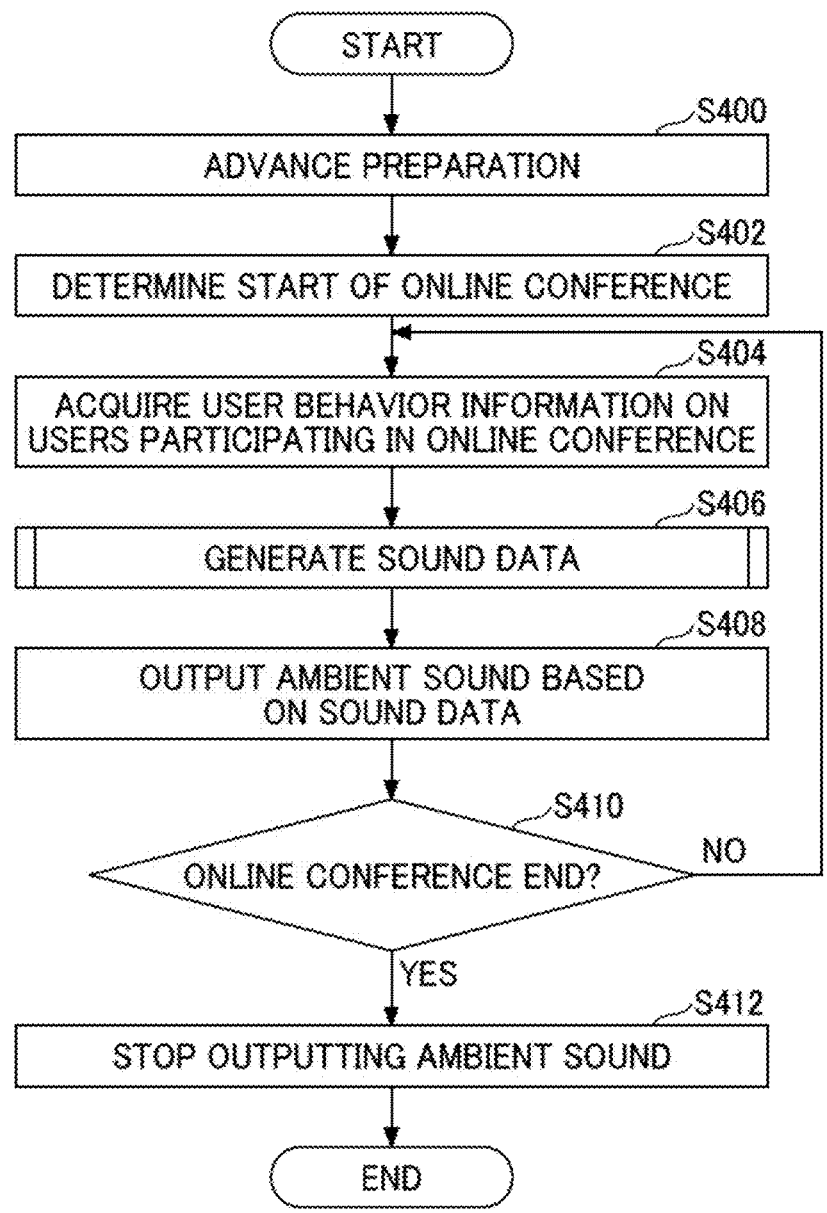

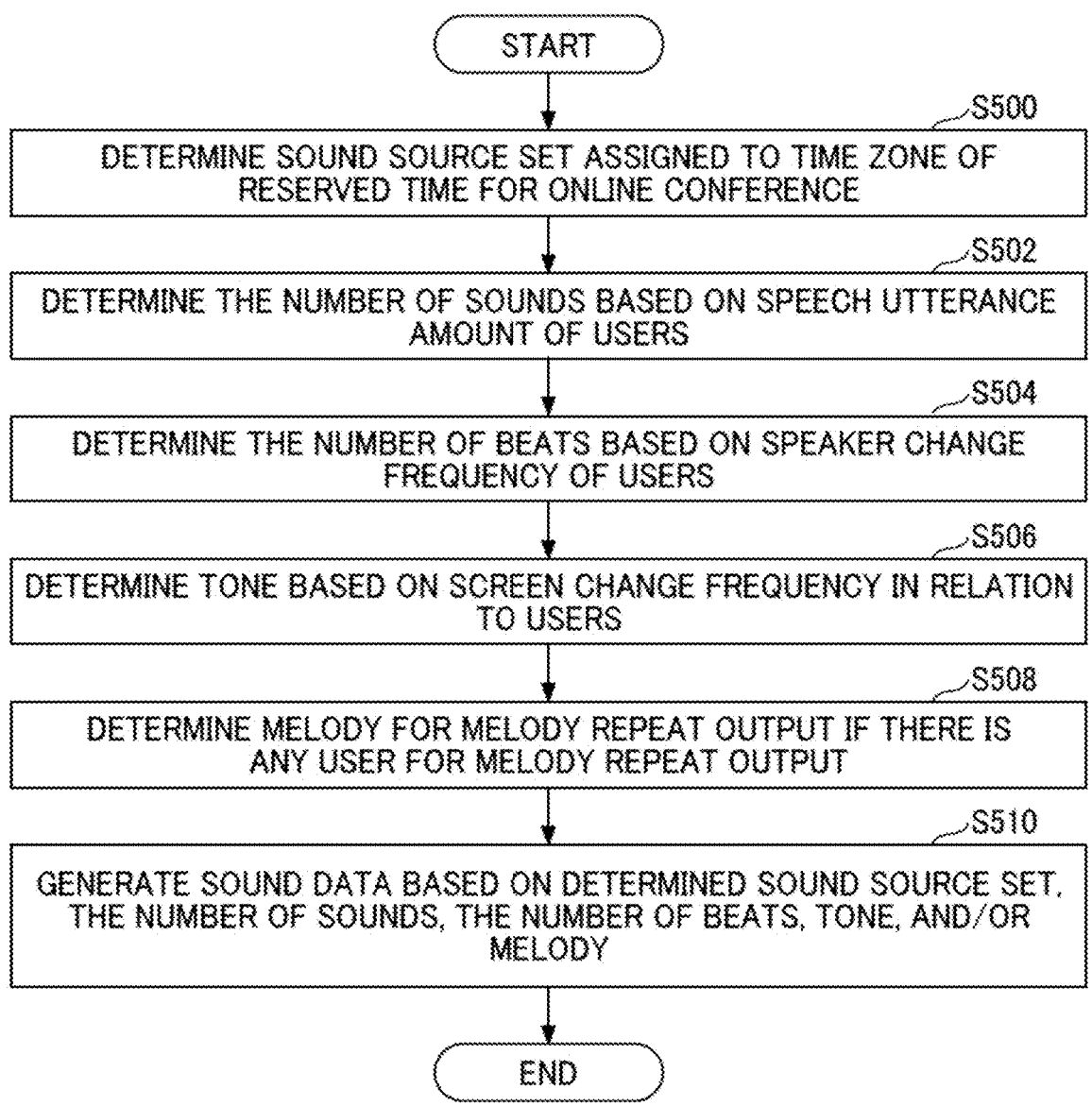

INFORMATION PROCESSING APPARATUS, INFORMATION PROCESSING SYSTEM, INFORMATION PROCESSING METHOD, AND NON-TRANSITORY RECORDING MEDIUM TO GENERATE SOUND DATA INCLUDING BEATS BASED ON USER BEHAVIOR INFORMATION IN A SCHEDULED CONFERENCE

CROSS-REFERENCE TO RELATED APPLICATIONS

This patent application is based on and claims priority pursuant to 35 U.S.C. § 119(a) to Japanese Patent Application No. 2022-007840, filed on Jan. 21, 2022, in the Japan Patent Office, the entire disclosure of which is hereby incorporated by reference herein.

BACKGROUND

Technical Field

The present disclosure relates to an information processing apparatus, an information processing system, an information processing method, and a non-transitory recording medium.

Related Art

A technique in which an ambient sound such as background music (BGM) is used to smoothly progress a conference in which a plurality of users has a conversation in a room or via a communication network has been known.

A technique for modifying ambient background noise based on information on mood or behavior (or both) of a user is also known.

SUMMARY

An embodiment of the present disclosure includes an information processing apparatus including circuitry to acquire behavior information of a plurality of users having a conversation, generate sound data based on the behavior information, and cause an output device to output an ambient sound based on the sound data.

An embodiment of the present disclosure includes an information processing system including the above-described information processing apparatus and an output device including another circuitry to output the ambient sound based on the sound data.

An embodiment of the present disclosure includes an information processing method including acquiring behavior information of a plurality of users having a conversation, generating sound data based on the behavior information, and causing an output device to output an ambient sound based on the sound data.

An embodiment of the present disclosure includes a non-transitory recording medium storing a plurality of instructions which, when executed by one or more processors, causes the processors to perform the above-described method.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 6 is an illustration of a configuration of reservation information according to the first embodiment of the disclosure;

FIG. 7 is an illustration of a configuration of sound source information according to the first embodiment of the disclosure;

FIG. 8 is an illustration of a configuration of sound rate information according to the first embodiment of the disclosure;

FIG. 9 is an illustration of a configuration of beat rate information according to the first embodiment of the disclosure;

FIG. 10 is an illustration of a configuration of tone information according to the first embodiment of the disclosure;

FIG. 11 is an illustration of a configuration of melody information according to the first embodiment of the disclosure;

FIG. 13 is a flowchart illustrating an example of a process of generating sound data according to the first embodiment of the disclosure;

FIG. 14 is an illustration of a configuration of sound rate information according to a second embodiment of the disclosure;

FIG. 15 is an illustration of a configuration of beat rate information according to the second embodiment of the disclosure;

FIG. 16 is an illustration of a configuration of tone information according to the second embodiment of the disclosure;

FIG. 20 is an illustration of a configuration of tone information according to the third embodiment of the disclosure;

FIG. 21 is a flowchart illustrating an example of a process performed by the information processing system according to the third embodiment of the disclosure; and FIG. 22 is a flowchart illustrating an example of a process of generating sound data according to the third embodiment of the disclosure.

Figure 1:
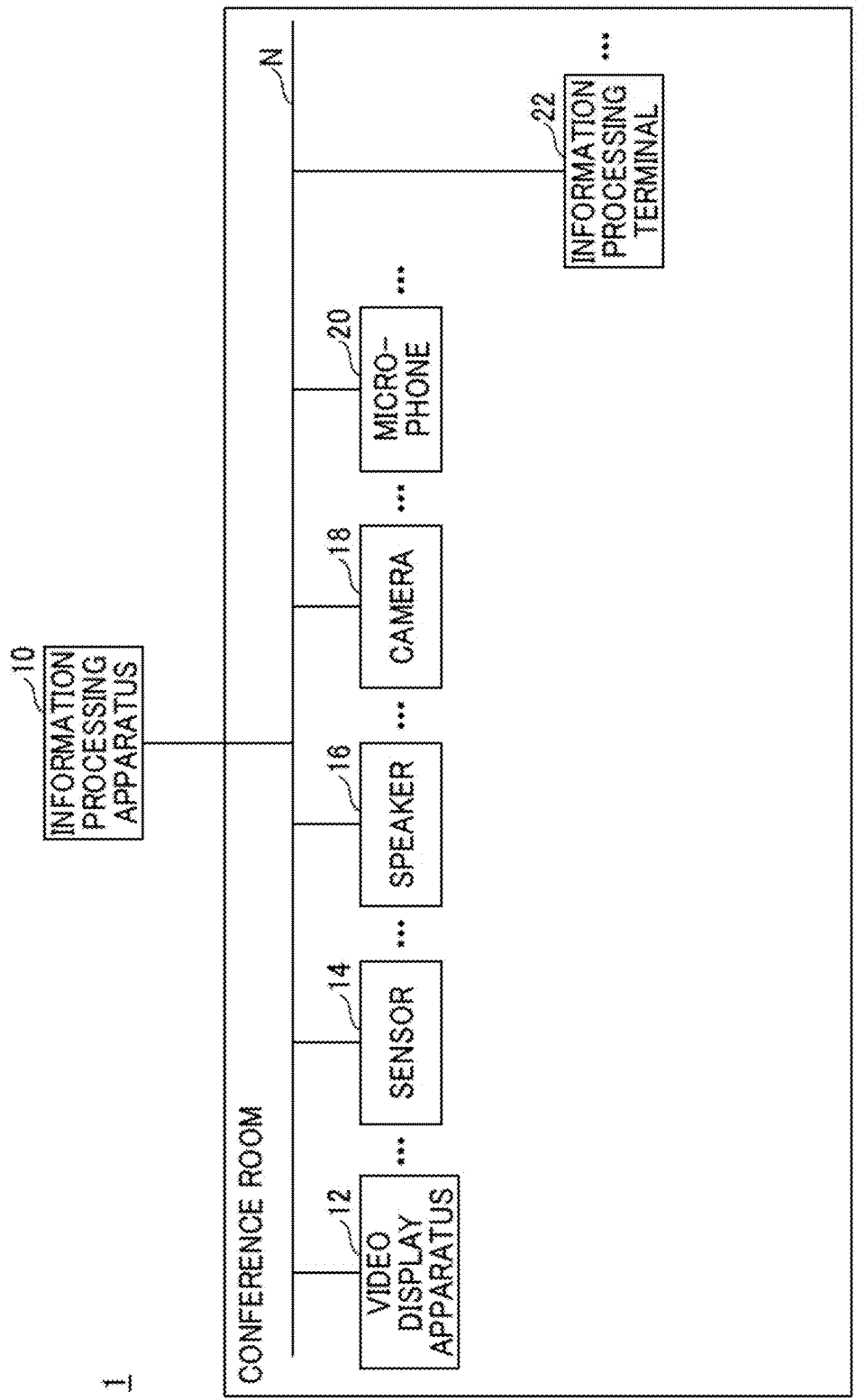
FIG. 1 is a schematic diagram illustrating a configuration of an information processing system according to a first embodiment of the disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Hereinafter, embodiments of the present disclosure are described with reference to the drawings. In the present exemplary embodiments, an example in which a plurality of users in a conference room has a conversation and an example in which a plurality of users in an online conference has a conversation via a communication network are described as examples in which an interaction between users occurs. However, the embodiments are not limited to such conferences. The present embodiment can be applied to various scenes in which an interaction between users occurs, such as seminars, meetings, discussions, conversations, presentations, and brainstorms.

First Embodiment

System Configuration

Figure 2:
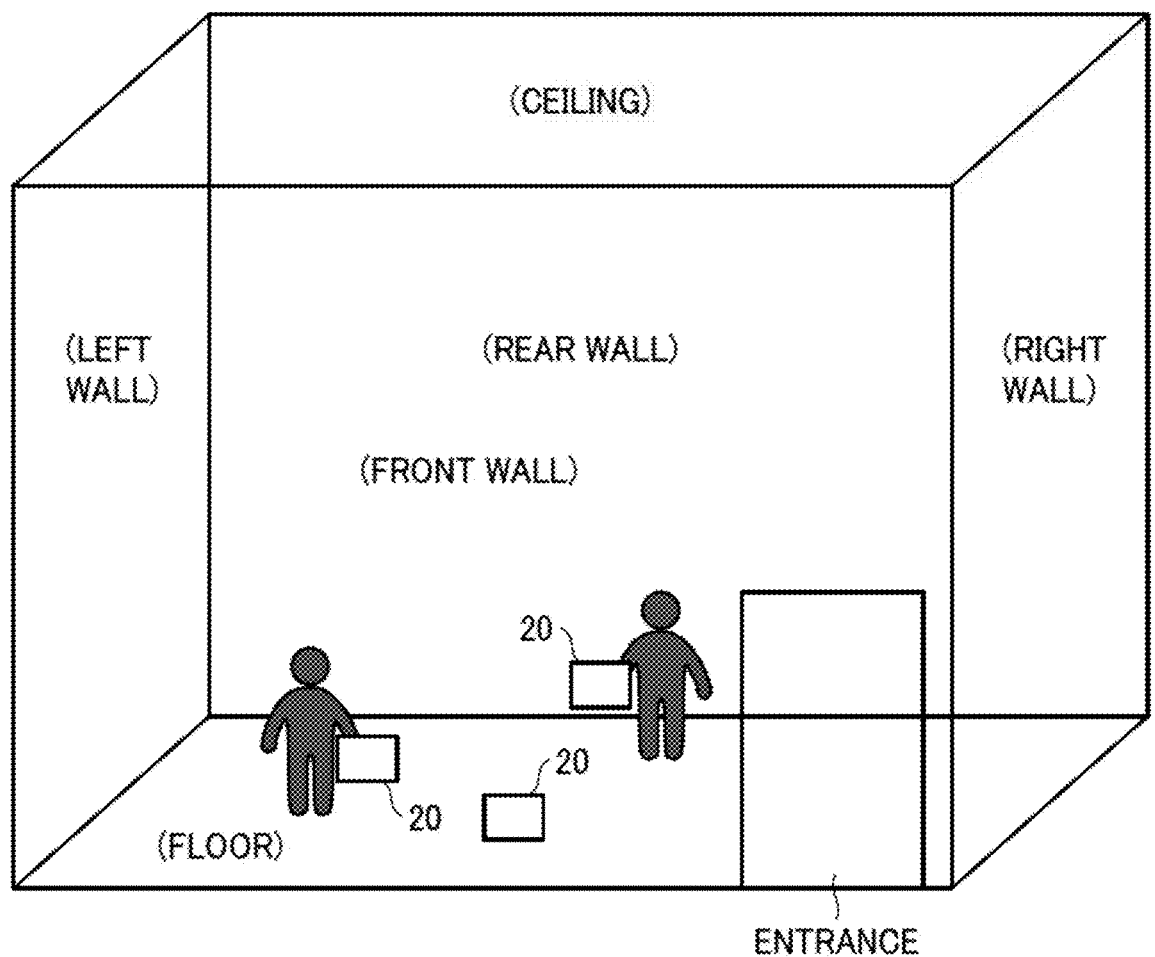
FIG. 2 is an illustration for describing an example of a conference room according to the first embodiment of the disclosure.

FIG. 1 is a schematic diagram illustrating a configuration of an information processing system 1 according to an exemplary embodiment of the disclosure. FIG. 2 is an illustration for describing an example of a conference room according to the present embodiment. The information processing system 1 of FIG. 1 includes an information processing apparatus 10, a video display apparatus 12, a sensor 14, a speaker 16, a camera 18, a microphone 20, and an information processing terminal 22 that are connected in a wired or wireless manner so as to communicate with each other via a network N such as the Internet or a local area network (LAN).

The video display apparatus 12, the sensor 14, the speaker 16, the camera 18, the microphone 20, and the information processing terminal 22 are provided in the conference room. The conference room may be provided with, for example, a temperature sensor, a humidity sensor, or an illuminance sensor that acquires at least a part of surroundings-dependent information and notifies the information processing apparatus 10 of the acquired information. Although FIG. 1 illustrates an example in which the information processing apparatus 10 is provided outside the conference room, in another example, the information processing apparatus 10 is provided inside the conference room.

For example, each user who enters the conference room has a tag such as a beacon that transmits radio waves. The sensor 14 provided in the conference room receives the radio waves transmitted from the tag of each user who is in the conference room as a signal for detecting position information of the user and notifies the information processing apparatus 10 of the signal. The sensor 14 can be any sensor having a positioning system that can receive the signal used for detecting the position information of each user. For example, the tag that is a subject to be measured includes a dedicated tag, a smartphone, and various types of Bluetooth Low Energy (BLE) sensors. The information processing apparatus 10 detects the position information of each user in the conference room based on the signal used for detecting the position information of the user notified from one or more sensors 14. The tag described above is an example of a transmitting device, and the transmitting device may not be in the form of a tag as long as the transmitting device transmits a signal used for detecting the position information of the user.

The information processing terminal 22 is a device operated by the user in the conference room. For example, the information processing terminal 22 includes, for example, a notebook personal computer (PC), a mobile phone, a smartphone, a tablet terminal, a game machine, a personal digital assistant (PDA), a digital camera, a wearable PC, a desktop PC, and a device dedicated to a conference. The information processing terminal 22 may be brought into the conference room by a user or may be provided in the conference room.

In addition, the information processing terminal 22 may be a subject to be measured by the positioning system. For example, the sensor 14 in the conference room may receive radio waves transmitted from the tag of the information processing terminal 22 and transmit the received radio waves to the information processing apparatus 10. For example, as illustrated in FIG. 2, the sensor 14 notifies the information processing apparatus 10 of the signal used for detecting the position information of the user who operates the information processing terminal 22 in the conference room. The tag may be built in the information processing terminal 22 or may be provided in any other suitable form. The information processing terminal 22 may be provided with a sensor that measures heartbeat of the user, and may notify the information processing apparatus 10 of the measured heartbeat of the user.

The camera 18 in the conference room captures a video image in the conference room and transmits video data of captured video image to the information processing apparatus 10 as an output signal. For example, a video camera of KINECT can be used as the camera 18. The video camera of KINECT is an example of a video camera that has a range image sensor, an infrared sensor, and an array microphone. When such a video camera having a range image sensor, an infrared sensor, and an array microphone is used, motion and posture of each user are recognizable.

The microphone 20 in the conference room converts voice of each user into an electrical signal. The microphone 20 transmits the electric signal converted from the voice of each user to the information processing apparatus 10 as an output signal. In alternative to the microphone 20 in the conference room, or in addition to the microphone 20 in the conference room, a microphone of the information processing terminal 22 may be used.

The speaker 16 in the conference room converts an electric signal into a physical signal and outputs sound such as ambient sound. The speaker 16 outputs the sound such as the ambient sounds under the control of the information processing apparatus 10. In alternative to the speaker 16 in the conference room, or in addition to the speaker 16 in the conference room, a speaker of the information processing terminal 22 may be used. Each of the microphone 20 in the conference room and the microphone of the information processing terminal 22 is an example of an input device. Each of the speaker 16 in the conference room and the speaker of the information processing terminal 22 is an example of an output device.

The number of video display apparatuses 12 in the conference room is more than one, and one example of the video display apparatus 12 in the conference room is a projector with which an image can be displayed on a surface of a side partitioning the conference room as illustrated in FIG. 2 under the control of the information processing apparatus 10. The surface of the side that partitions the conference room from the other space includes, for example, a front wall, a rear wall, a right wall, a left wall, a floor, and a ceiling. The video display apparatus 12 is an example of a display device that displays an image, and any display device that has at least a function of displaying an image is applicable as the video display apparatus 12.

The shape of the conference room illustrated in FIG. 2 is just an example, and the conference room can have any other shape. In addition, not all of the sides of the conference rooms are necessarily partitioned by walls, a floor, and a ceiling. In other words, a part of the sides of the conference room may not be closed, but open. The conference room is an example of a space in which the plurality of users is present together. For example, such a space includes various types of spaces such as a room where a seminar or a lecture is held, a meeting space, and an event space. As described above, the space described in the present embodiment is a concept including a place or a room where a plurality of users is present.

The information processing apparatus 10 outputs the ambient sound suitable for an interaction between the users in the conference room, (for example, a conversation and an interaction in a conference) based on the position information of each user detected by the signal notified from the sensor 14, the output signal from the camera 18, and the output signal from the microphone 20, as will be described later.

The configuration of the information processing system 1 illustrated in FIG. 1 is an example. The information processing apparatus 10 may be implemented by a single computer or a plurality of computers, or may be implemented by using a cloud service. The information processing apparatus 10 includes, for example, a projector, a display apparatus having an electronic whiteboard function, an output apparatus such as digital signage, a head-up display (HUD) apparatus, an industrial machine, an imaging apparatus, a sound collecting apparatus, a medical device, a network home appliance, a connected car, a notebook PC, a mobile phone, a smartphone, a tablet terminal, a game machine, a PDA, a digital camera, a wearable PC, and a desktop PC.

Hardware Configuration

Computer

Figure 3:
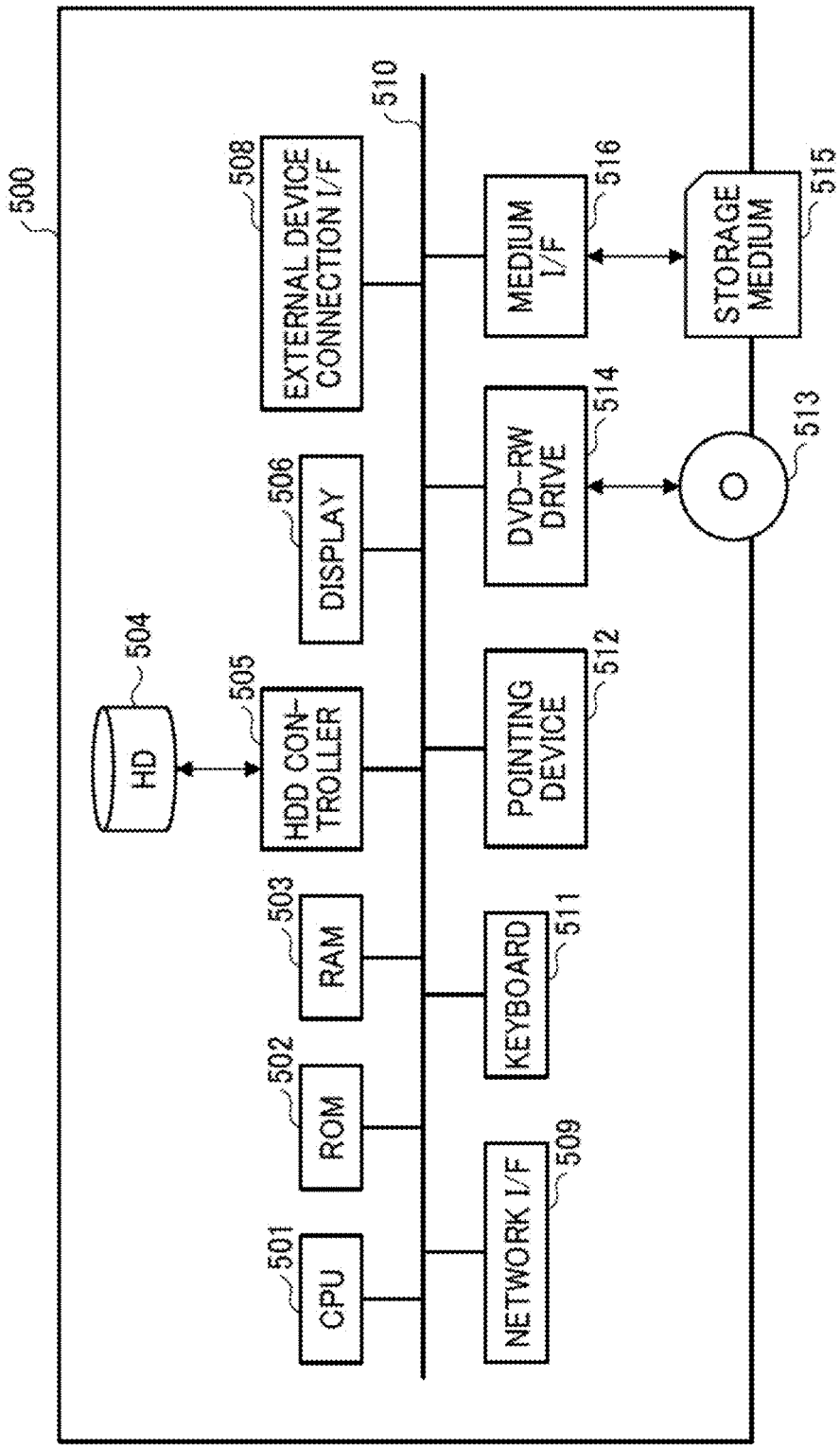
FIG. 3 is a block diagram illustrating an example of a hardware configuration of a computer according to the first embodiment of the disclosure.

The information processing apparatus 10 is implemented by, for example, a computer 500 having a hardware configuration as illustrated in FIG. 3. In a case that the information processing terminal 22 is a PC, the information processing terminal 22 is implemented by the computer 500 having the hardware configuration as illustrated in FIG. 3.

FIG. 3 is a block diagram illustrating an example of a hardware configuration of a computer according to the present embodiment. As illustrated in FIG. 3, the computer 500 includes a central processing unit (CPU) 501, a read only memory (ROM) 502, a random access memory (RAM) 503, a hard disk (HD) 504, a hard disk drive (HDD) controller 505, a display 506, an external device connection interface (I/F) 508, a network I/F 509 a data bus 510, a keyboard 511, a pointing device 512, a digital versatile disk rewritable (DVD-RW) drive 514, and a medium I/F 516.

The CPU 501 controls the entire operation of the computer 500. The ROM 502 stores programs such as an initial program loader (IPL) to boot the CPU 501. The RAM 503 is used as a work area for the CPU 501. The HD 504 stores various data such as a program. The HDD controller 505 controls reading and writing of various data from and to the HD 504 under control of the CPU 501.

The display 506 displays various information such as a cursor, a menu, a window, a character, or an image. The external device connection I/F 508 is an interface that for connecting to various external devices. Examples of the external devices include, but not limited to, a universal serial bus (USB) memory and a printer. The network I/F 509 is an interface for performing data communication using the network N. Examples of the data bus 510 include, but not limited to, an address bus and a data bus that electrically connect the components, such as the CPU 501, with one another.

The keyboard 511 is one example of an input device provided with a plurality of keys for allowing a user to input characters, numerals, or various instructions. The pointing device 512 is an example of an input device that allows a user to select or execute a specific instruction, select a target for processing, or move a cursor being displayed. The DVD-RW drive 514 reads and writes various data from and to a DVD-RW 513, which is an example of a removable recording medium. The removable storage medium is not limited to the DVD-RW and may be a Digital Versatile Disc-Recordable (DVD-R) or the like. The medium I/F 516 controls reading and writing (storing) of data from and to a recording medium 515 such as a flash memory.

Smartphone

Figure 4:
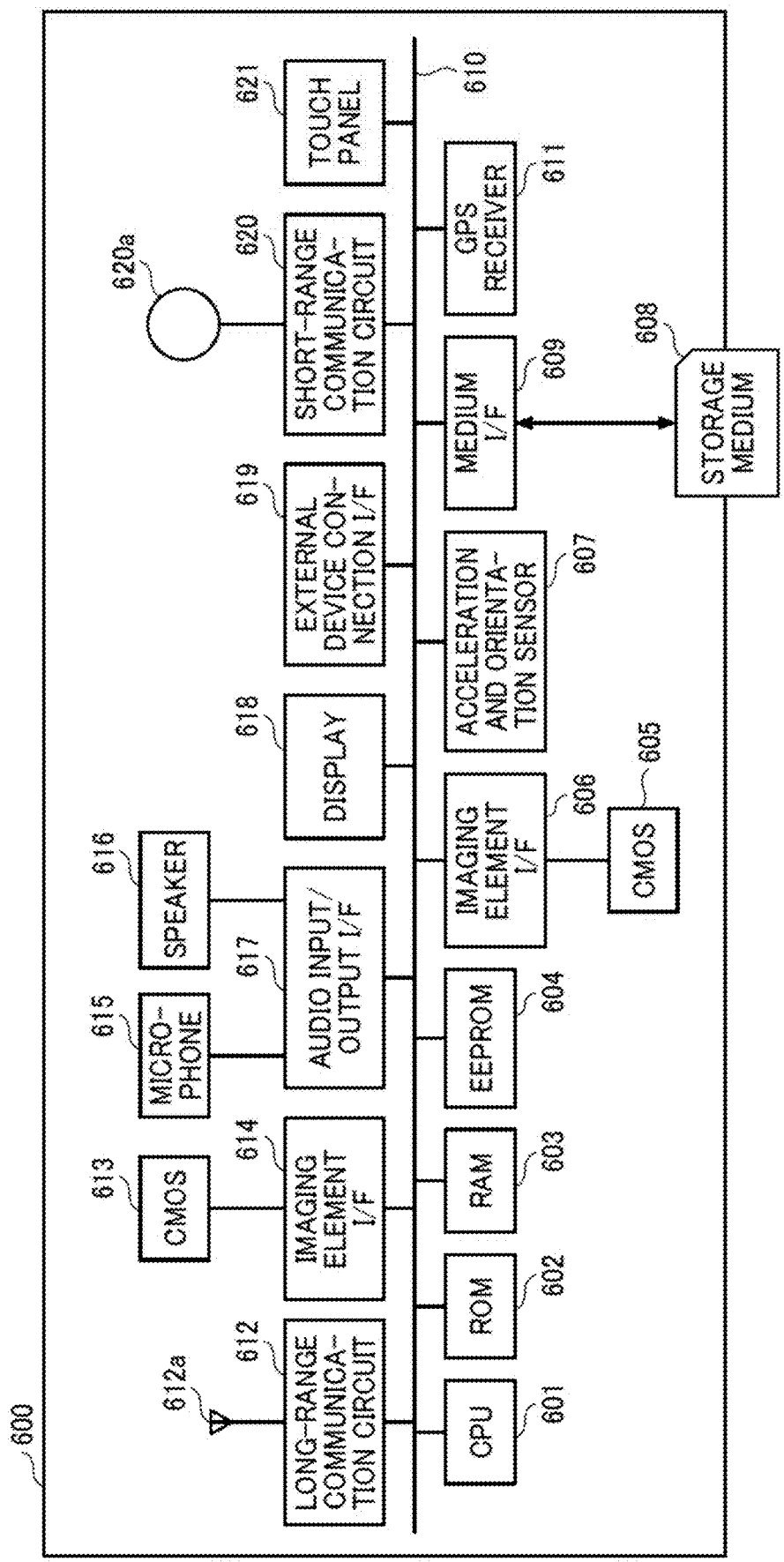
FIG. 4 is a block diagram illustrating an example of a hardware configuration of a smartphone according to the first embodiment of the disclosure.

The information processing terminal 22 can be implemented by, for example, a smartphone 600 having a hardware configuration as illustrated in FIG. 4. Even when the information processing terminal 22 is, for example, a notebook PC, a mobile phone, a smartphone, a tablet terminal, a game machine, a PDA, a digital camera, a wearable PC, a desktop PC, or a device dedicated to a conference room, the information processing terminal 22 may be implemented by a hardware configuration substantially the same as or similar to the hardware configuration as illustrated in FIG. 4. In addition, a part of the hardware configuration illustrated in FIG. 4 may be excluded, or another functional unit may be added in the hardware configuration illustrated in FIG. 4.

FIG. 4 is a block diagram illustrating an example of the hardware configuration of the smartphone 600 according to the present embodiment. As illustrated in FIG. 4, the smartphone 600 includes a CPU 601, a ROM 602, a RAM 603, an electrically erasable and programmable ROM (EEPROM) 604, a complementary metal oxide semiconductor (CMOS) sensor 605, an imaging element I/F 606, an acceleration and orientation sensor 607, a medium I/F 609, and a global positioning system (GPS) receiver 611.

The CPU 601 controls the entire operation of the smartphone 600. The ROM 602 stores programs such as an IPL to boot the CPU 601. The RAM 603 is used as a work area for the CPU 601. The EEPROM 604 reads or writes various data such as a control program for a smartphone under control of the CPU 601.

The CMOS sensor 605 is an example of a built-in imaging device configured to capture an object (mainly, a self-image of a user operating the smartphone 600) under control of the CPU 601 to obtain image data. In alternative to the CMOS sensor 605, an imaging element such as a charge-coupled device (CCD) sensor can be used. The imaging element I/F 606 is a circuit that controls driving of the CMOS sensor 605. Examples of the acceleration and orientation sensor 607 include an electromagnetic compass or gyrocompass for detecting geomagnetism and an acceleration sensor.

The medium I/F 609 controls reading or writing (storing) of data from or to a storage medium 608 such as a flash memory. The GPS receiver 611 receives a GPS signal from a GPS satellite.

The smartphone 600 further includes a long-range communication circuit 612, a CMOS sensor 613, an imaging element I/F 614, a microphone 615, a speaker 616, an audio input/output I/F 617, a display 618, an external device connection I/F 619, a short-range communication circuit 620, an antenna 620a for the short-range communication circuit 620, and a touch panel 621.

The long-range communication circuit 612 is a circuit for communicating with other devices through the network N. The CMOS sensor 613 is an example of a built-in imaging device configured to capture an object under control of the CPU 601 to obtain image data. The imaging element I/F 614 is a circuit that controls driving of the CMOS sensor 613. The microphone 615 is a built-in circuit that converts sound including voice into an electric signal. The speaker 616 is a built-in circuit that generates sound such as an ambient sound, a music, or a voice sound by converting an electric signal into physical vibration.

The audio input/output I/F 617 is a circuit that processes input and output of audio signals between the microphone 615 and the speaker 616 under control of the CPU 601. The display 618 is an example of a display device configured to display an image of the object, various icons, etc. Examples of the display 618 include, but not limited to, a liquid crystal display (LCD) and an organic electroluminescence (EL) display.

The external device connection I/F 619 is an interface for connecting to various external devices. The short-range communication circuit 620 is a communication circuit that communicates in compliance with the near field communication (NFC) or BLUETOOTH, for example. The touch panel 621 is an example of an input device configured to enable a user to operate the smartphone 600 by touching a screen of the display 618.

The smartphone 600 further includes a bus line 610. The bus line 610 is an address bus, a date bus, or the like for electrically connecting components such as the CPU 601 illustrated in FIG. 4.

Functional Configuration

Figure 5:
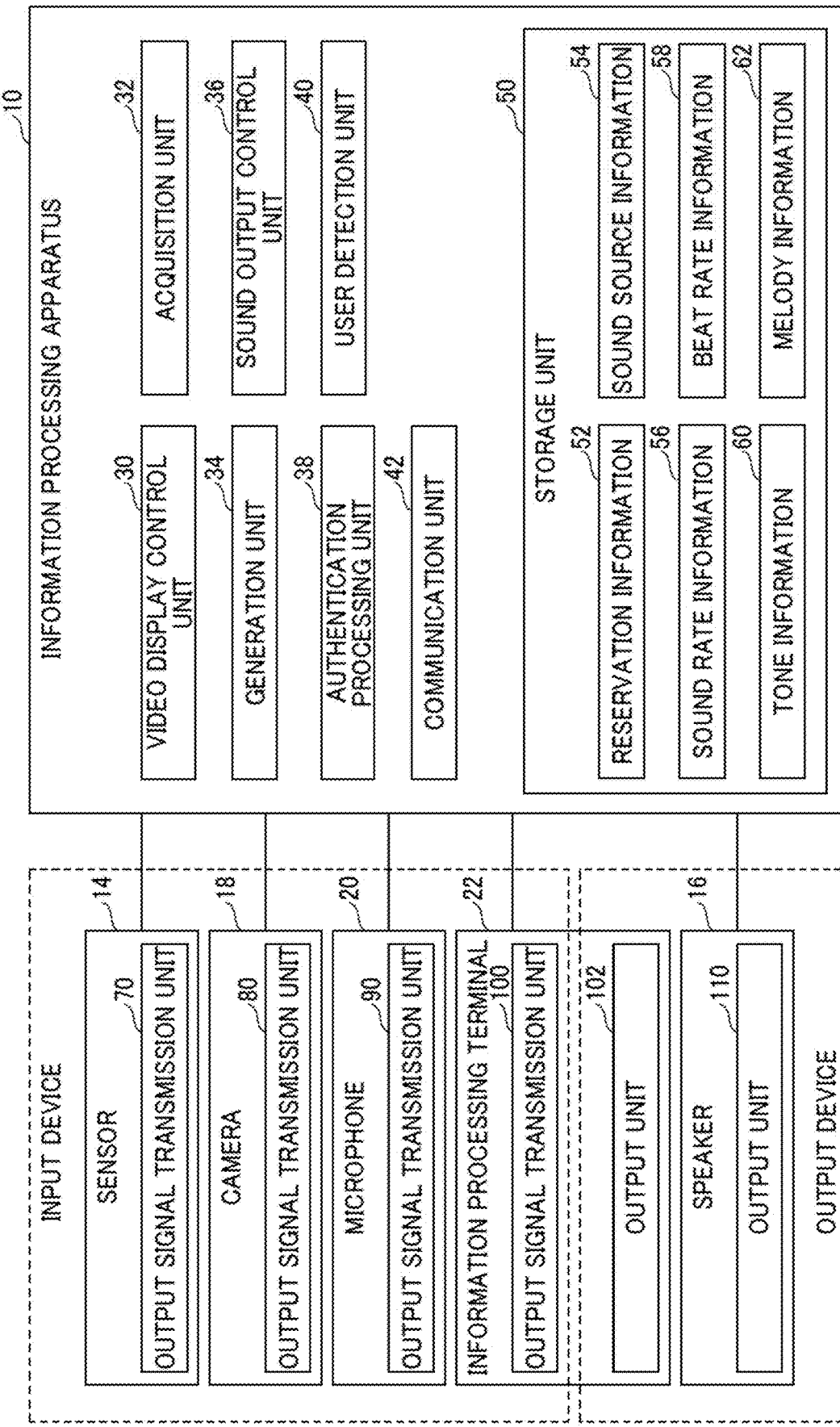
FIG. 5 is a block diagram illustrating an example of a functional configuration of the information processing system according to the first embodiment of the disclosure.

The information processing system 1 according to the present embodiment is implemented by, for example, a functional configuration as illustrated in FIG. 5. FIG. 5 is a block diagram illustrating an example of a functional configuration of the information processing system according to the present embodiment. In the functional configuration of FIG. 5, some components unnecessary for the description of the present embodiment are omitted for simplicity.

The information processing apparatus 10 illustrated in FIG. 5 includes a video display control unit 30, an acquisition unit 32, a generation unit 34, a sound output control unit 36, an authentication processing unit 38, a user detection unit 40, a communication unit 42, and a storage unit 50. The storage unit 50 stores reservation information 52, sound source information 54, sound rate information 56, beat rate information 58, tone information 60, and melody information 62, which are described later.

The sensor 14 includes an output signal transmission unit 70. The speaker 16 includes an output unit 110. The camera 18 includes an output signal transmission unit 80. The microphone 20 includes an output signal transmission unit 90. The information processing terminal 22 includes an output signal transmission unit 100 and an output unit 102.

The output signal transmission unit 70 of the sensor 14 transmits to the information processing apparatus 10 a signal used for detecting each of the plurality of users in the conference room as an output signal. The output signal transmission unit 80 of the camera 18 transmits to the information processing apparatus 10 an imaging result obtained by imaging the inside of the conference room as an output signal. The output signal transmission unit 90 of the microphone 20 transmits to the information processing apparatus 10 an electric signal converted from the voice of the plurality of users in the conference room as an output signal.

The output signal transmission unit 100 of the information processing terminal 22 transmits to the information processing apparatus 10 an electric signal converted by the microphone 615 from the voice of the user operating the information processing terminal 22 as an output signal. The output unit 102 of the information processing terminal 22 outputs sound such as the ambient sound based on the sound data received from the information processing apparatus 10. The output unit 110 of the speaker 16 outputs sound such as the ambient sound based on the sound data received from the information processing apparatus 10.

Each of the output signal transmission units 70, 80, 90, and 100 illustrated in FIG. 5 is an example of an input device. Each of the output units 102 and 110 is an example of an output device.

The communication unit 42 of the information processing apparatus 10 receives the signal used for detecting the position information of the user from the output signal transmission unit 70 of the sensor 14. The communication unit 42 receives the imaging result obtained by capturing the image of the inside of the conference room as an output signal from the output signal transmission unit 80 of the camera 18. The communication unit 42 receives an electric signal converted from the voice of the plurality of users in the conference room as an output signal from the output signal transmission unit 90 of the microphone 20. The communication unit 42 receives an electric signal converted by the microphone 615 from the voice of the user who operates the information processing terminal 22 as an output signal from the output signal transmission unit 100 of the information processing terminal 22. The communication unit 42 further receives an operation signal received by the information processing terminal 22 according to a user operation performed by the user.

The user detection unit 40 detects the user in the conference room based on the signal used for detecting the position information of the user received from the sensor 14. The user detection unit 40 further detects the position information of the user in the conference room. The authentication processing unit 38 performs authentication processing for each user in the conference room. The video display control unit 30 controls the video image displayed by the video display apparatus 12.

The acquisition unit 32 acquires behavior information of one or more users in a conference room. In the description of embodiments, the behavior information of a user may be referred to as user behavior information. An example of the user behavior information acquired by the acquisition unit 32 is a speech utterance amount of the plurality of users in the conference room. An example of the user behavior information acquired by the acquisition unit 32 is frequency of speaker changes among the plurality of users in the conference room. In addition, an example of the user behavior information acquired by the acquisition unit 32 is information on a user who continuously speaks equal to or more than a predetermined time in the conference room. The predetermined time may be set by, for example, a user or a designer. Information on the speech utterance amount, the frequency of speaker changes, and the information on a user who continuously speaks are measurable based on the output signal of the microphone 20 or the microphone 615.

The acquisition unit 32 acquires surroundings-dependent information inside or outside the conference room. Examples of the surroundings-dependent information acquired by the acquisition unit 32 is, for example information on weather, atmospheric temperature (temperature), temperature, humidity, illuminance, operating noise of equipment, noise, or time zone. For example, the acquisition unit 32 may acquire, from an external server that provides the surroundings-dependent information in response to a request, the surroundings-dependent information such as information on weather and temperature disclosed on the Internet, by transmitting the request to the external server. The acquisition unit 32 may acquire the surroundings-dependent information from an external server by using an Application Programming Interface (API), when the API is provided. The acquisition unit 32 may acquire information on the heartbeat of the user in the conference room as an example of the user behavior information.

The generation unit 34 generates the sound data as described later based on the behavior information of the plurality of users in the conference room and the surroundings-dependent information inside or outside the conference room. The generation unit 34 may generate the sound data as described later based on the behavior information of the plurality of users in the conference room without using the surroundings-dependent information. The sound output control unit 36 controls the output unit 102 of the information processing terminal 22 or the output unit 110 of the speaker 16 to output the ambient sound based on the generated sound data.

The storage unit 50 stores, in table formats, reservation information 52, sound source information 54, sound rate information 56, beat rate information 58, tone information 60, and melody information 62, as described FIGS. 6 to 11, with reference to each of which a description is given later.

The reservation information 52, the sound source information 54, the sound rate information 56, the beat rate information 58, the tone information 60, and the melody information 62 do not necessarily be in the table formats as illustrated in FIGS. 6 to 11, and, in alternative to the above-described information in the table formats, similar information or the substantially same information may be stored to be managed.

FIG. 6 is an illustration of a configuration of the reservation information according to the present embodiment. The reservation information illustrated in FIG. 6 includes items of reservation identification (ID), room ID, reservation time, and participating user. The reservation ID is an example of identification information for identifying a record of reservation information. In the description of embodiments, each record of reservation information may be simply referred to as reservation information. The room ID is an example of identification information for a conference room reserved in relation to a record of reservation information. The reserved time is an example of date and time information for a conference scheduled in relation to a record of reservation information. The participating user is an example of participant information of a conference scheduled in relation to a record of reservation information.

For example, in the example of FIG. 6, as a first record, the reservation information, which is in relation to a scheduled conference, including the information items of reserved time of "2022/01/12 13:00-14:00," participating user of "USER 1, USER 2, USER 3, USER 4," room ID of "room001" is registered.

FIG. 7 is an illustration of a configuration of the sound source information according to the present embodiment. The sound source information illustrated in FIG. 7 includes items of reservation ID, time zones A to D, and assigned sound sources for the time zones A to D. The reservation ID is an example of identification information for identifying a record of reservation information. The time zones A to D are an example of information on a plurality of time zones obtained by dividing a period of time of the reserved time for the conference into four. For example, in the example of FIG. 7, the time zones of the first record includes the time zone A of "13:00-13:10," the time zone B of "13:10-13:30," the time zone C "13:30-13:50," and the time zone D "13:50-14:00." The example of FIG. 7 is an example in which the reserved time is divided into the time zone A corresponding to "17%," the time zone B corresponding to "33%," the time zone C corresponding to "33%," and the time zone D corresponding to "17%." FIG. 7 is an example, and the number and ratio of time zones is not limited.

One of a plurality of sets of sound sources is assigned to each of the time zones A to D. In the description of embodiments, the set of sound sources may be referred to as a sound source set. The sound source sets may be automatically assigned to the time zones A to D, or may be assigned by an organizer, an administrator, or a manager in relation to the conference, for example.

FIG. 8 is an illustration of a configuration of the sound rate information according to the present embodiment. The sound rate information illustrated in FIG. 8 includes items of sound count level, speech utterance amount, and the number of sounds. The sound count level is an example of identification information for classification. The speech utterance amount is an example of information that indicates frequency of speech utterances of the users in the conference room. In the example of FIG. 8, the speech utterance amount is represented by how many seconds, in a predetermined period of time (for example, in the last 60 seconds), a state in which at least a user being in the conference room is speaking out (a state in which a person who is speaking out presents) is. The number of sounds represents the number of sounds used to be overlapped with the ambient sound.

According to the sound rate information illustrated in FIG. 8, the longer a time period of the state in which a speaker (user who is speaking out) is present in the conference room is, the higher the sound count level is, and accordingly, the larger the number of sounds used to be overlapped with the ambient sound is. According to the sound rate information illustrated in FIG. 8, the shorter a time period of the state in which a speaker (user who is speaking out) is present in the conference room is, the lower the sound count level is, and accordingly, the less the number of sounds used to be overlapped with the ambient sound is.

FIG. 9 is an illustration of a configuration of the beat rate information according to the present embodiment. The beat rate information in FIG. 9 includes items of beat level, frequency of speaker changes, and the number of beats. The beat level is an example of identification information for classification. The frequency of speaker changes is an example of information that indicates how lively a conversation or discussion between the plurality of users being in the conference room, namely degree of liveliness of the conversation or the discussions. In the example of FIG. 9, the frequency of speaker changes is indicated by the number of times that the speaker has changed during a predetermined time (for example, the last 60 seconds). The number of beats indicates beats used in the ambient sound.

According to the beat rate information illustrated in FIG. 9, the higher the frequency of speaker changes, the greater the beat level is, and accordingly, the number beats in the ambient sound increases. According to the beat rate information illustrated in FIG. 9, the lower the frequency of speaker changes is, the lower the number level is, and accordingly, the number of beats in the ambient sound decreases.

FIG. 10 is an illustration of a configuration of the tone information according to the present embodiment. The tone information illustrated in FIG. 10 includes items of tone level, weather information, and tone. The tone level is an example of identification information for classification. The weather information is an example of surroundings-dependent information that in information depending on surroundings outside the conference room. In the example of FIG. 10, the weather outside the conference room is indicated by sunny, cloudy, and rainy. The tone represents a tone used in the ambient sound.

According to the tone information of FIG. 10, the tone used in the ambient sound is changed depending on the weather outside the conference room. Note that the tone may be changed according to the tone information of FIG. 10 in all of the time zones A to D indicated in FIG. 7, or the tone may be changed according to the tone information of FIG. 10 in a part of the time zones A to D (for example, the time zones A and D).

FIG. 11 is an illustration of a configuration of the melody information according to the present embodiment. The melody information illustrated in FIG. 11 includes items of participating user and melody. The participating user is an example of information that indicates a participant of the conference scheduled in relation to the reservation information. The melody is an example of information that indicates a melody used for a refrain (repeat) performance assigned to each participating user in an ambient sound. The refrain performance of a melody indicates playing or output a melody repeatedly or repeating the melody, and may be referred to as a melody repeat output in the description of the embodiment.

According to the melody information of FIG. 11, when a period of time of a state in which a specific user participating in the conference is continuously speaking is a predetermined time or more, the melody assigned to the speaking user can be used as the ambient sound.

Process

Figure 12:
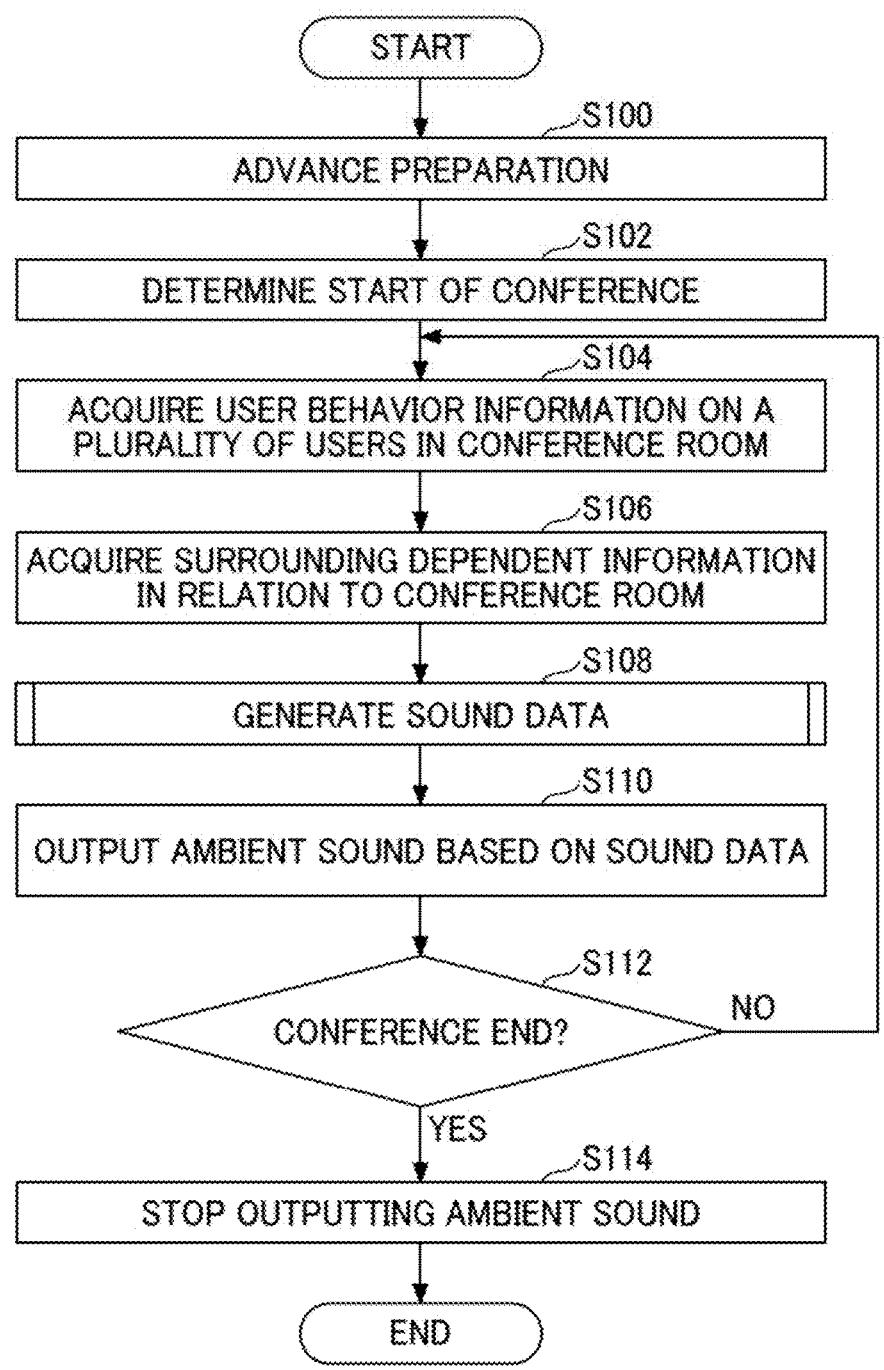
FIG. 12 is a flowchart illustrating an example of a process performed by the information processing system according to the first embodiment of the disclosure.

The information processing system 1 according to the present embodiment outputs the ambient sound to the conference room by a process as illustrated in FIG. 12, for example. FIG. 12 is a flowchart illustrating an example of a process performed by the information processing system, according to the present embodiment.

In step S100, the information processing system 1 according to the present embodiment registers and sets various kind of information as advance preparation according to an operation performed by a user such as an organizer of the conference. More specifically, the advance preparation includes registration of the reservation information of FIG. 6 stored in the storage unit 50 of the information processing apparatus 10, setting of the sound source information of FIG. 7, setting of the sound rate information of FIG. 8, setting of the beat rate information of FIG. 9, setting of the tone information of FIG. 10, and setting of the melody information of FIG. 11, for example. The information processing apparatus 10 is accessed by the information processing terminal 22 used by the user, and the communication unit 42 of the information processing apparatus 10 receives operation information from the information processing terminal 22, so that the registration and setting of the various kinds of information stored in the storage unit 50 are performed by being modified, added, or deleted. Note that the setting of the sound source information of FIG. 7, the setting of the sound rate information of FIG. 8, setting of the beat rate information of FIG. 9, setting of the tone information of FIG. 10, and setting of the melody information of FIG. 11 may be automatically performed by the information processing apparatus 10 based on the registration illustrated in the reservation information of FIG. 6.

In step S102, in the information processing system 1 according to the present embodiment, the information processing apparatus 10 determines that the conference has been started based on the reservation information of FIG. 6. Alternatively, the determination of the start of the conference may be made based on information that is based on an input operation of the user such as the organizer of the conference. The information based on the input operation of the user is received by the communication unit 42 of the information processing apparatus 10 from the information processing terminal 22, which receives the input operation performed by the user. Alternatively, the determination of the start of the conference may be made by detection of a user being in the conference room or motion of such the user. Alternatively, the information processing apparatus 10 may make the determination based on an output signal of the microphone 20 or the microphone 615. The output signal corresponds to voice uttered by a user. In the present embodiment, the start of the conference is determined as an example. In some embodiments, as a start of an interaction between users, a start of a seminar, a meeting, a discussion, a conversation, a presentation, or a brainstorming may be determined.

In step S104, in the information processing system 1 according to the present embodiment, the acquisition unit 32 acquires behavior information of a plurality of users in the conference room. The user behavior information acquired by the acquisition unit 32 in step S104 is, for example, the speech utterance amount of the plurality of users in the conference room, the frequency of speaker changes, and information on a user who continuously speaks equal to or more than a predetermined time in the conference room.

In step S106, in the information processing system 1 according to the present embodiment, the acquisition unit 32 acquires surroundings-dependent information that depends on surroundings inside or outside the conference room. In the description of the present embodiment, the acquisition unit 32 acquires the weather information indicating a weather outside the conference room from an external server using the API. In some embodiments, the weather information may be acquired by another method.

In step S108, in the information processing system 1 according to the present embodiment, based on the behavior information of the plurality of users in the conference room acquired in step S104 and the weather information acquired in step S106, the generation unit 34 generates the sound data according to a process illustrated in FIG. 13, for example.

FIG. 13 is a flowchart illustrating an example of a process of generating sound data according to the present embodiment. In step S200, the generation unit 34 determines a sound source set assigned to each of the time zone A to D of the reserved time of the conference based on the reservation information of FIG. 6 and the sound source information illustrated in FIG. 7.

In step S202, the generation unit 34 determines the number of sounds to be used to overlap with the ambient sound based on the speech utterance amount of the plurality of users n the conference room based on the sound rate information illustrated in FIG. 8. In step S204, the generation unit 34 determines the number of beats to be used in the ambient sound based on the frequency of speaker changes among the plurality of users in the conference room based on the beat rate information illustrated in FIG. 9. In step S206, the generation unit 34 determines a tone to be used in the ambient sound based on the weather information indicating a weather outside the conference room based on the tone information illustrated in FIG. 10.

In addition, in step S208, when a period of time of a state in which a specific user participating in the conference is continuously speaking out is equal to or longer than a predetermined time, the generation unit 34 determines that the specific user is a user corresponding to the melody repeat output. Based on the melody information illustrated in FIG. 11, the generation unit 34 determines a melody assigned to the user corresponding to the melody repeat output.

In step S210, the generation unit 34 generates the sound data based on the determined sound source set, the number of sounds, the number of beats, the tone, and the melody. Note that the process of generating the sound data may be a composition process or a process of selecting sound data corresponding to a combination of the sound source set, the number of sounds, the number of beats, the tone, and the melody.

Returning to step S110 of FIG. 12, the sound output control unit 36 controls the output unit 102 of the information processing terminal 22 or the output unit 110 of the speaker 16 to output the ambient sound based on the sound data generated in step S108. The ambient sound includes any types of sounds, such as music, voice, and white noise. When each individual sound may be output from one of the plurality of speakers 16, an individual ambient sound may be output for each of the plurality of users in the conference room. In other words, the ambient sound to be output may vary depending on each of a plurality areas corresponding to the plurality of speakers 16 in the conference room.

As described above, with the information processing system 1 according to the present embodiment, the ambient sound that changes according to, for example, a condition or a state of a conversation between the plurality of users in the conference room. The information processing system 1 according to the present embodiment can output the ambient sound suitable for the interaction between the plurality of users in the conference room, by setting the sound source set, the number of sounds, the number of beats, the tone, and the melody, which are to be used for generating the sound data in step S108, in manner that the ambient sound suitable for a situation of the plurality of users in the conference room is to be output.

For example, the information processing system 1 according to the present embodiment can output the ambient sound suitable for some or all of the plurality of users who are nervous in the conference room on the assumption that the degree of tension of the participating users of the conference is higher as the speech utterance amount and the frequency of speaker changes among the plurality of users in the conference room are larger. The information processing system 1 according to the present embodiment can output the ambient sound suitable for some or all of the plurality of users who are relaxing in the conference room on the assumption that the degree of relaxation of the participating users of the conference is higher as the speech utterance amount and the frequency of speaker changes among the plurality of users in the conference room are smaller.

The processing of steps S104 to S112 is repeated until the conference ends. When the conference ends, the process proceeds to step S114, and the sound output control unit 36 ends outputting the ambient sound from the output unit 102 of the information processing terminal 22 or the output unit 110 of the speaker 16.

Second Embodiment

In the first embodiment, the speech utterance amount of the plurality of users in the conference room and the frequency of speaker changes among the plurality of users in the conference room are described as examples of the user behavior information. In a second embodiment described below, as another example of the user behavior information, a posture change amount of the plurality of users in the conference room and frequency of posture changes of the plurality of users in the conference room are used. The user behavior information may be the speech utterance amount of the plurality of users in the conference room, the frequency of speaker changes among the plurality of users in the conference room, the posture change amount of the plurality of users in the conference room, and the frequency of posture changes of the plurality of users in the conference room.

The posture change amount of the plurality of users in the conference room can be measured based on a change amount of a volume of a posture bounding box of the user recognized by the image processing on the video data captured by the camera 18. For example, the posture bounding box can be determined based on a boundary or a bounding box that is a three dimensional point cloud corresponding to a position of the user by obtaining the three dimensional point cloud from the video camera of KINECT.

The frequency of posture changes of the plurality of users in the conference room can be measured based on the number of times that the volumes of the posture bounding boxes of the plurality of users recognized by the image processing on the video data captured by the camera 18 have changed by a predetermined ratio or more. The predetermined ratio may be set by, for example, a user or a designer.

In the information processing system 1 according to the second embodiment, sound rate information 56, beat rate information 58, and tone information 60 are configured as illustrated in FIGS. 14 to 16, respectively, for example. FIG. 14 is an illustration of a configuration of the sound rate information according to the present embodiment. FIG. 15 is an illustration of a configuration of the beat rate information according to the present embodiment. FIG. 16 is an illustration of a configuration of the tone information according to the present embodiment.

The sound rate information illustrated in FIG. 14 includes items of sound count level, posture information, and the number of sounds. The sound count level is an example of identification information for classification. The posture information is an example of information that indicates the posture change amount of the plurality of users in the conference room. In the example of FIG. 14, the posture information is represented by an amount of change in the volume of the posture bounding box of the plurality of users in the conference room in the last 60 seconds. The number of sounds represents the number of sounds used to be overlapped with the ambient sound.

According to the sound rate information illustrated in FIG. 14, the larger the posture change amount of the plurality of users in the conference room is, the higher the sound count level is, and accordingly, the larger the number of sounds used to be overlapped with the ambient sound is. According to the sound rate information illustrated in FIG. 14, the smaller the posture change amount of the plurality of users in the conference room is, the less the sound count level is, and accordingly, the less the number of sounds used to be overlapped with the ambient sound is.

The beat rate information in FIG. 15 includes items of beat level, frequency of posture changes, and the number of beats. The beat level is an example of identification information for classification. The frequency of posture changes is an example of information that indicates frequency of posture changes of the plurality of users in the conference room. In FIG. 15, as an example, the frequency of posture changes of the plurality of users in the conference room is represented by the number of times that the volumes of the posture bounding boxes of the plurality of users in the conference room in the last 60 seconds have changed by a predetermined ratio or more. The number of beats indicates beats used in the ambient sound.

According to the beat rate information illustrated in FIG. 15, the higher the frequency of posture changes of the plurality of users in the conference room is, the greater the beat level is, and accordingly, the number beats in the ambient sound increases. According to the beat rate information illustrated in FIG. 15, the lower the frequency of posture changes of the plurality of users in the conference room is, the less the beat level is, and accordingly, the number beats in the ambient sound decreases.

The tone information illustrated in FIG. 16 includes items of tone level, temperature information, and tone. The tone level is an example of identification information for classification. The temperature information is an example of surroundings-dependent information that in information depending on surroundings outside or inside the conference room. In the example of FIG. 16, the information indicates the temperature outside or inside the conference room by low, ordinary, or high. The tone represents a tone used in the ambient sound.

According to the tone information of FIG. 16, the tone used in the ambient sound is changed depending on the temperature outside or inside the conference room.

The information processing system 1 according to the second embodiment outputs the ambient sound to the conference room in accordance with the process as illustrated in FIG. 12. In step S100, the information processing system 1 according to the second embodiment registers and sets various kind of information as advance preparation according to an operation performed by a user such as an organizer of the conference. More specifically, the advance preparation includes registration of the reservation information of FIG. 6 stored in the storage unit 50 of the information processing apparatus 10, setting of the sound source information of FIG. 7, setting of the sound rate information of FIG. 14, setting of the beat rate information of FIG. 15, setting of the tone information of FIG. 16, and setting of the melody information of FIG. 11, for example. The information processing apparatus 10 is accessed by the information processing terminal 22 used by the user, and the communication unit 42 of the information processing apparatus 10 receives operation information from the information processing terminal 22, so that the registration and setting of the various kinds of information stored in the storage unit 50 are performed by being modified, added, or deleted.

Note that the setting of the sound source information of FIG. 7, the setting of the sound rate information of FIG. 14, setting of the beat rate information of FIG. 15, setting of the tone information of FIG. 16, and setting of the melody information of FIG. 11 may be automatically performed by the information processing apparatus 10 based on the registration illustrated in the reservation information of FIG. 6.

In step S102, in the information processing system 1 according to the second embodiment, the information processing apparatus 10 determines that the conference has been started based on the reservation information of FIG. 6. Alternatively, the determination of the start of the conference may be made based on information that is based on an input operation of the user such as the organizer of the conference. The information based on the input operation of the user is received by the communication unit 42 of the information processing apparatus 10 from the information processing terminal 22, which receives the input operation performed by the user.

Alternatively, the determination of the start of the conference may be made by detection of a user being in the conference room or motion of such the user. Alternatively, the information processing apparatus 10 may make the determination based on an output signal of the microphone 20 or the microphone 615. The output signal corresponds to voice uttered by a user. In the present embodiment, the start of the conference is determined as an example. In some embodiments, a start of an interaction between users in such as a seminar, a meeting, a discussion, a conversation, a presentation, or a brainstorming may be determined. In step S104, in the information processing system 1 according to the second embodiment, the acquisition unit 32 acquires the behavior information of the plurality of users in the conference room. The user behavior information acquired by the acquisition unit 32 in step S104 according to the second embodiment is, for example, the posture change amount of the plurality of users in the conference room, the frequency of posture changes of the plurality of users in the conference room, and information on a user who continuously speaks equal to or more than the predetermined time in the conference room.

In step S106, in the information processing system 1 according to the second embodiment, the acquisition unit 32 acquires the surroundings-dependent information inside or outside the conference room. In the description of the present embodiment, the acquisition unit 32 acquires the temperature information outside or inside the conference room.

Figure 17:
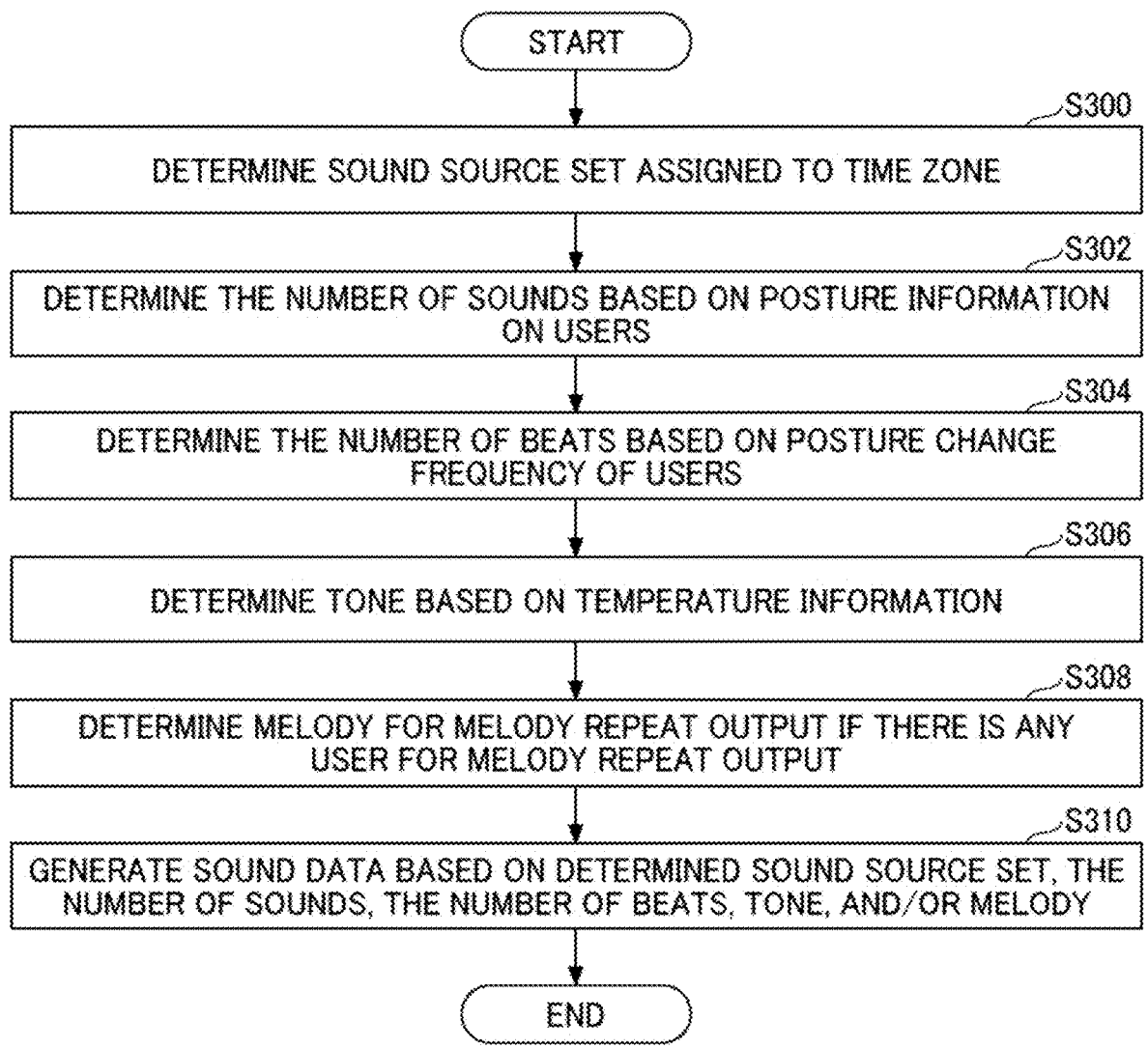
FIG. 17 is a flowchart illustrating an example of a process of generating sound data according to the second embodiment of the disclosure.

In step S108, in the information processing system 1 according to the second embodiment, based on the behavior information of the plurality of users in the conference room acquired in step S104 and the temperature information acquired in step S106, the generation unit 34 generates the sound data according to a process illustrated in FIG. 17, for example.

FIG. 17 is a flowchart illustrating an example of a process of generating the sound data. In step S300, the generation unit 34 determines a sound source set assigned to each of the time zone A to D of the reserved time of the conference based on the reservation information of FIG. 6 and the sound source information illustrated in FIG. 7.

In step S302, the generation unit 34 determines the number of sounds to be used to overlap with the ambient sound based on the posture information of the plurality of users in the conference room based on the sound rate information illustrated in FIG. 14. In step S304, the generation unit 34 determines the number of beats to be used in the ambient sound based on the frequency of posture changes of the plurality of users in the conference room based on the beat rate information illustrated in FIG. 15. In step S306, the generation unit 34 determines a tone to be used in the ambient sound based on the temperature information indicating a temperature outside or inside the conference room based on the tone information illustrated in FIG. 16.

In addition, in step S308, when a period of time of a state in which a specific user participating in the conference is continuously speaking out is equal to or longer than a predetermined time, the generation unit 34 determines that the specific user is a user corresponding to the melody repeat output. Based on the melody information illustrated in FIG. 11, the generation unit 34 determines a melody assigned to the user corresponding to the melody repeat output.

In step S310, the generation unit 34 generates sound based on the determined sound source set, number of notes, number of beats, tones, and melodies. Returning to step S110 of FIG. 12, the sound output control unit 36 controls the output unit 102 of the information processing terminal 22 or the output unit 110 of the speaker 16 to output the ambient sound based on the sound data generated in step S108.

As described above, with the information processing system 1 according to the second embodiment, the ambient sound that changes according to, for example, a condition or a state of the posture changes of the plurality of users in the conference room.

The information processing system 1 according to the second embodiment can output the ambient sound suitable for the interaction between the plurality of users in the conference room, by setting the sound source set, the number of sounds, the number of beats, the tone, and the melody, which are to be used for generating the sound data in step S108, in manner that the ambient sound suitable for a condition or a state of the posture change of the plurality of users in the conference room is to be output. For example, the information processing system 1 according to the second embodiment can output the ambient sound suitable for some or all of the plurality of users who are nervous in the conference room on the assumption that the degree of tension of the participating users of the conference is higher as the posture change amount of the plurality of users in the conference room are larger.

The processing of steps S104 to S112 is repeated until the conference ends. When the conference ends, the process proceeds to step S114, and the sound output control unit 36 ends outputting the ambient sound from the output unit 102 of the information processing terminal 22 or the output unit 110 of the speaker 16.

Third Embodiment

In the information processing system 1 according to the first embodiment, the example in which the plurality of users in a conference room has a conversation is described. In an information processing system 2 according to a third embodiment, an example in which a plurality of users in an online conference has a conversation is described.

System Configuration

Figure 18:
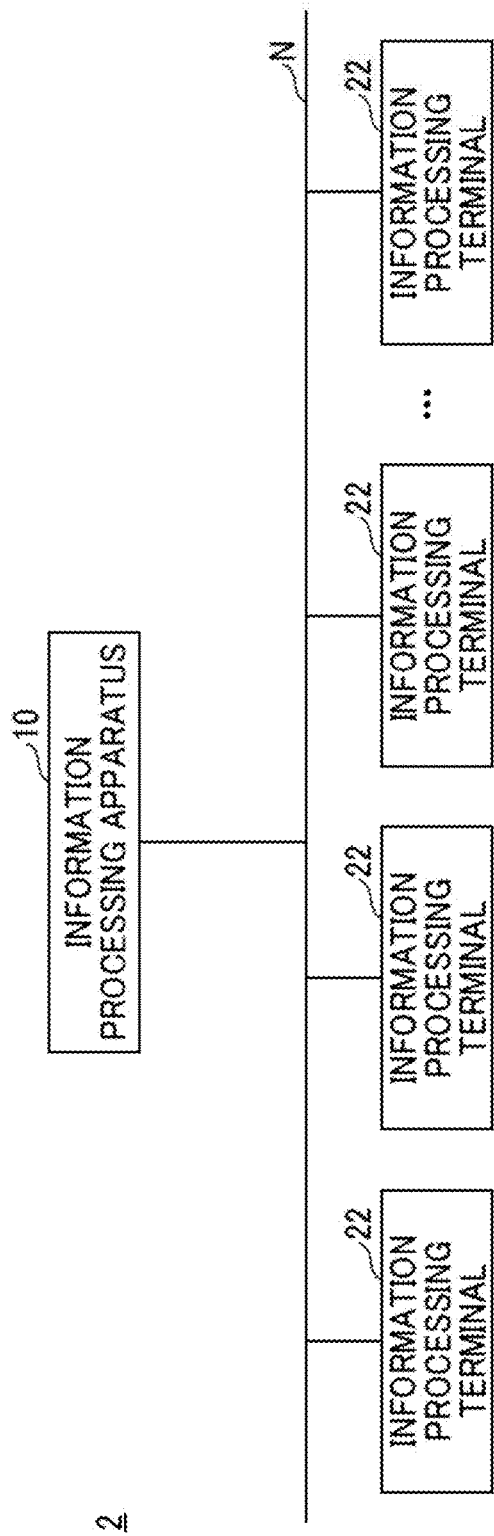
FIG. 18 is a schematic diagram illustrating a configuration of an information processing system according to a third embodiment of the disclosure.

FIG. 18 is a schematic diagram illustrating a configuration of the information processing system 2 according to the present embodiment of the disclosure. The information processing system 2 of FIG. 18 includes an information processing apparatus 10 and an information processing terminal 22 that are connected in a wired or wireless manner so as to be communicate via a network N such as the Internet or a LAN.

The information processing terminal 22 is a device used by each of the plurality of users to participate in the online conference. For example, the information processing terminal 22 includes, for example, a PC, a mobile phone, a smartphone, a tablet terminal, a game machine, a PDA, a digital camera, a wearable PC, a desktop PC, and a device dedicated to a conference.

A microphone of the information processing terminal 22 converts voice of the user into an electrical signal. The microphone of the information processing terminal 22 transmits the electric signal converted from the voice of each user to the information processing apparatus 10 as an output signal. A speaker of the information processing terminal 22 converts an electric signal into a physical signal and outputs sound such as ambient sound. The speaker of the information processing terminal 22 outputs the sound such as the ambient sounds under the control of the information processing apparatus 10. The microphone of the information processing terminal 22 is an example of an input device. The speaker of the information processing terminal 22 is an example of an output device.

The information processing apparatus 10 outputs the ambient sound suitable for the interaction between the users in the online conference room, (for example, a conversation and an interaction in a conference) based on the output signal from the microphone of information processing terminal 22, as will be described later.

The configuration of the information processing system 2 illustrated in FIG. 18 is an example. The information processing apparatus 10 may be implemented by a single computer or a plurality of computers, or may be implemented by using a cloud service.

The information processing apparatus 10 includes a projector, a display apparatus having an electronic whiteboard function, an output apparatus such as digital signage, a HUD apparatus, an industrial machine, an imaging apparatus, a sound collecting apparatus, a medical device, a network home appliance, a motor vehicle, a notebook PC, a mobile phone, a smartphone, a tablet terminal, a game machine, a PDA, a digital camera, a wearable PC, and a desktop PC.

Figure 19:
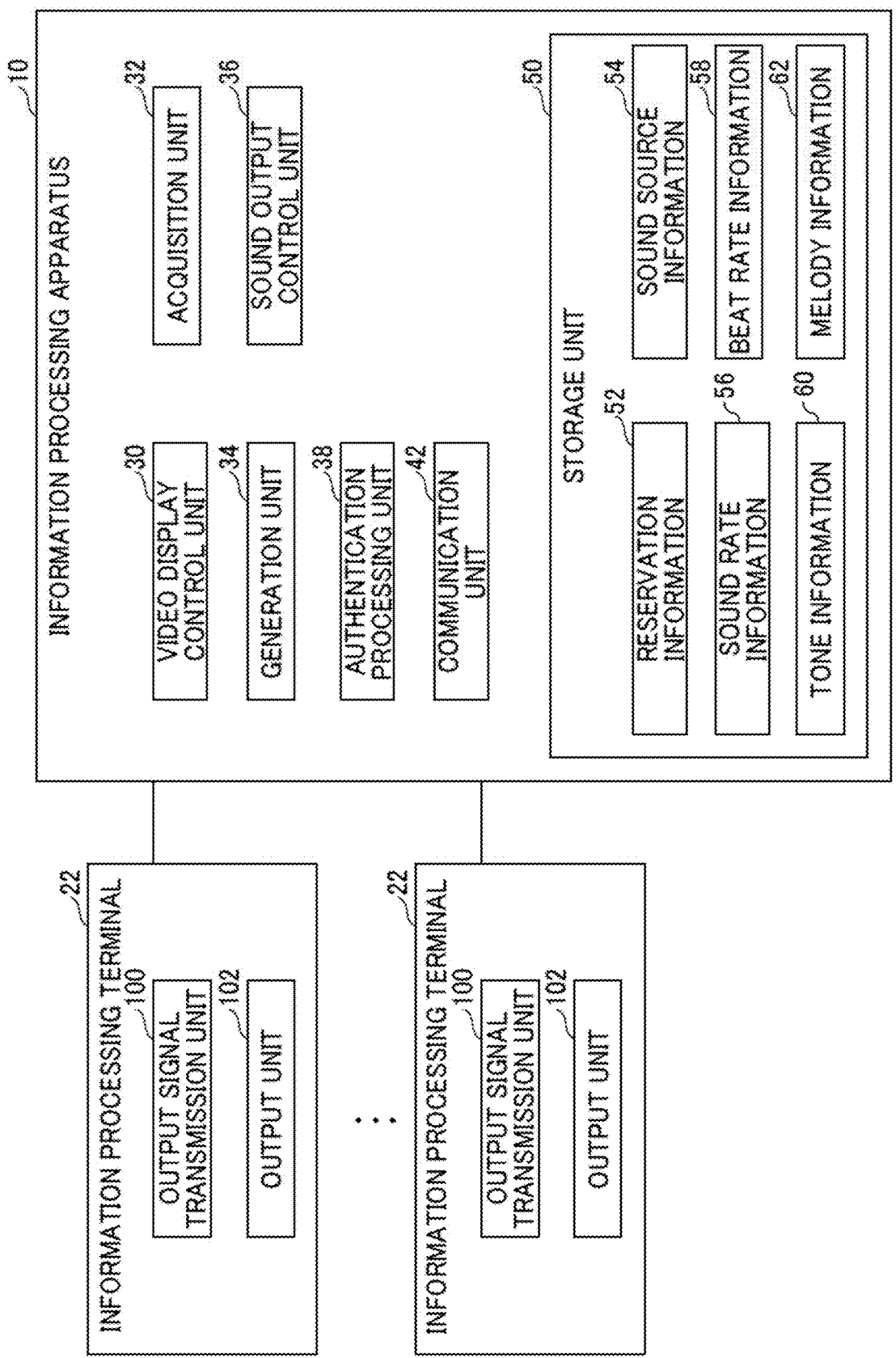
FIG. 19 is a block diagram illustrating an example of a functional configuration of the information processing system according to the third embodiment.

The information processing system 2 according to the present embodiment is implemented by, for example, a functional configuration as illustrated in FIG. 19. FIG. 19 is a block diagram illustrating an example of a functional configuration of the information processing system according to the present embodiment. In the functional configuration of FIG. 19, some components unnecessary for the description of the third embodiment are omitted for simplicity.

The information processing apparatus 10 illustrated in FIG. 19 includes a video display control unit 30, an acquisition unit 32, a generation unit 34, a sound output control unit 36, an authentication processing unit 38, a communication unit 42, and a storage unit 50. The storage unit 50 stores reservation information 52, sound source information 54, sound rate information 56, beat rate information 58, tone information 60, and melody information.

The output signal transmission unit 100 of the information processing terminal 22 transmits to the information processing apparatus 10 an electric signal converted by the microphone 615 from the voice of the user operating the information processing terminal 22 as an output signal. The output unit 102 of the information processing terminal 22 outputs sound such as the ambient sound based on the sound data received from the information processing apparatus 10. The output signal transmission unit 100 illustrated in FIG. 19 is an example of an input device. The output unit 102 is an example of an output device.

The communication unit 42 of the information processing apparatus 10 receives an electric signal converted by the microphone 615 from the voice of the user who operates the information processing terminal 22 as an output signal from the output signal transmission unit 100 of the information processing terminal 22. The communication unit 42 further receives an operation signal received by the information processing terminal 22 according to a user operation performed by the user.

The authentication processing unit 38 performs authentication processing for each user who operates the information processing terminal 22. The video display control unit 30 controls a video image of such as a common screen displayed by the information processing terminal 22 in the online conference.

The acquisition unit 32 acquires behavior information of each user participating in the online conference. An example of the user behavior information acquired by the acquisition unit 32 is a speech utterance amount of the plurality of users in the online conference. An example of the user behavior information acquired by the acquisition unit 32 is frequency of speaker changes among the plurality of users in the online conference. In addition, an example of the user behavior information acquired by the acquisition unit 32 is information on a user who continuously speaks equal to or more than a predetermined time in the online conference. Information on the speech utterance amount, the frequency of speaker changes, and the information on a user who continuously speaks are measurable based on the output signal of the microphone 615.

In addition, the acquisition unit 32 acquires surroundings-dependent information such as information on weather, atmospheric temperature (temperature), temperature, humidity, illuminance, operating noise of equipment, noise, or time zone in the vicinity of the information processing terminal 22. The generation unit 34 generates the sound data as described later based on the behavior information of the plurality of users in the online conference and the surroundings-dependent information in the vicinity of the information processing terminal 22. The generation unit 34 may generate the sound data as described below based on the behavior information of the plurality of users in the online conference without using the surroundings-dependent information. The sound output control unit 36 controls the output unit 102 of the information processing terminal 22 to output the ambient sound based on the generated sound data.

The storage unit 50 stores, for example, the reservation information 52, the sound source information 54, the sound rate information 56, the beat rate information 58, tone information 60, and the melody information 62 illustrated in FIGS. 6 to 9, 11, and 20 in a table format.

Since the reservation information 52, the sound source information 54, the sound rate information 56, the beat rate information 58, and the melody information 62 are substantially the same as those in the first embodiment except for a part, the description of the same parts is omitted.

The room ID of the reservation information of FIG. 6 is an example of identification information for an online conference reserved in relation to a record of reservation information. The reserved time is an example of date and time information for an online conference scheduled in relation to a record of reservation information. The participating user is an example of participant information of an online conference scheduled in relation to a record of reservation information. The time zones A to D in the sound source information of FIG. 7 are an example of information on a plurality of time zones obtained by dividing a period of time of the reserved time for the online conference into four.

The speech utterance amount of the sound rate information of FIG. 8 is an example of information that indicates frequency of speech utterances of the users in the online conference. In the example of FIG. 8, the speech utterance amount is represented by how many seconds, in a predetermined period of time (for example, in the last 60 seconds), a state in which at least a user in the online conference is speaking out is.

The frequency of speaker changes in the beat rate information of FIG. 9 is an example of information that indicates how lively a conversation or discussion between the plurality of users in the online conference, namely degree of liveliness of the conversation or the discussions. In the example of FIG. 9, the frequency of speaker changes in the online conference is indicated by the number of times that the speaker has changed during a predetermined time (for example, the last 60 seconds).

FIG. 20 is an illustration of a configuration of the tone information according to the present embodiment. The tone information in FIG. 20 includes items of a tone class, a screen change amount, and a tone. The tone level is an example of identification information for classification. The screen change amount is an example of information indicating frequency of screen changes of one or more information processing terminals 22 operated by of the plurality of users in the online conference. In the example of FIG. 20, the frequency of screen changes of the one or more information processing terminals 22 operated by the plurality of users in the online conference is represented by the number of times that the screens of the one or more information processing terminals 22 operated by the plurality of users in the online conference in the last 60 seconds have changed by a predetermined ratio or more. The predetermined ratio may be set by, for example, a user or a designer. The tone represents a tone used in the ambient sound. According to the tone information of FIG. 20, the tone used in the ambient sound can be changed according to the frequency of screen changes of the one or more information processing terminals 22 operated by the plurality of users in the online conference.

The participating user in the melody information of FIG. 11 is an example of participant information of the online conference scheduled in relation to a record of the reservation information. According to the melody information of FIG. 11, when a period of time of a state in which a specific user participating in the online conference is continuously speaking is a predetermined time or more, the melody assigned to the speaking user can be used as the ambient sound.

The information processing system 2 according to the third embodiment outputs the ambient sound to the information processing terminal 22 of the user in the online conference by a process as illustrated in FIG. 21, for example. FIG. 21 is a flowchart illustrating an example of a process performed by the information processing system, according to the present embodiment.

In step S400, the information processing system 2 according to the third embodiment registers and sets various kind of information as advance preparation according to an operation performed by a user such as an organizer of the online conference. More specifically, the advance preparation includes registration of the reservation information of FIG. 6 stored in the storage unit 50 of the information processing apparatus 10, setting of the sound source information of FIG. 7, setting of the sound rate information of FIG. 8, setting of the beat rate information of FIG. 9, setting of the tone information of FIG. 20, and setting of the melody information of FIG. 11, for example. The information processing apparatus 10 is accessed by the information processing terminal 22 used by the user, and the communication unit 42 of the information processing apparatus 10 receives operation information from the information processing terminal 22, so that the registration and setting of the various kinds of information stored in the storage unit 50 are performed by being modified, added, or deleted. Note that the setting of the sound source information of FIG. 7, the setting of the sound rate information of FIG. 8, setting of the beat rate information of FIG. 9, setting of the tone information of FIG. 20, and setting of the melody information of FIG. 11 may be automatically performed by the information processing apparatus 10 based on the registration illustrated in the reservation information of FIG. 6.

In step S402, in the information processing system 2 according to the third embodiment, the information processing apparatus 10 determines that the online conference has been started based on the reservation information of FIG. 6. Alternatively, the determination of the start of the online conference may be made based on information that is based on an input operation of the user such as the organizer of the online conference. The information based on the input operation of the user is received by the communication unit 42 of the information processing apparatus 10 from the information processing terminal 22, which receives the input operation performed by the user. The online conference may start automatically based on the reserved time in the reservation information of FIG. 6.

In step S404, in the information processing system 2 according to the third embodiment, the acquisition unit 32 acquires the behavior information of the plurality of users in the online conference. The user behavior information acquired by the acquisition unit 32 in step S404 is, for example, the speech utterance amount of the plurality of users in the online conference, the frequency of speaker changes, and information on a user who continuously speaks equal to or more than a predetermined time in the online conference. An example of the user behavior information acquired by the acquisition unit 32 in step S404 is the screen change amount of the one or more information processing terminal 22 operated by the plurality of users in the online conference.

In step S406, in the information processing system 2 according to the third embodiment, based on the behavior information of the plurality of users in the online conference acquired in step S404, the generation unit 34 generates the sound data according to a process illustrated in FIG. 22, for example.

FIG. 22 is a flowchart illustrating an example of a process of generating the sound data. In step S500, the generation unit 34 determines a sound source set assigned to each of the time zone A to D of the reserved time of the online conference based on the reservation information of FIG. 6 and the sound source information illustrated in FIG. 7.

In step S502, the generation unit 34 determines the number of sounds to be used to overlap with the ambient sound based on the speech utterance amount of the plurality of users in the online conference based on the sound rate information illustrated in FIG. 8. In step S404, the generation unit 34 determines the number of beats to be used in the ambient sound based on the frequency of speaker changes among the plurality of users in the online conference based on the beat rate information illustrated in FIG. 9.

In step S506, the generation unit 34 determines the number of sounds to be used to overlap with the ambient sound based on the screen change amount of the information processing terminal 22 operated by the user in the online conference based on the sound rate information illustrated in FIG. 20.

In addition, in step S508, when a period of time of a state in which a specific user participating in the online conference is continuously speaking out is equal to or longer than a predetermined time, the generation unit 34 determines that the specific user is a user corresponding to the melody repeat output. Based on the melody information illustrated in FIG. 11, the generation unit 34 determines a melody assigned to the user corresponding to the melody repeat output. In step S510, the generation unit 34 generates the sound data based on the determined sound source set, the number of sounds, the number of beats, the tone, and the melody.

Returning to step S408 of FIG. 21, the sound output control unit 36 controls the output unit 102 of the information processing terminal 22 to output the ambient sound based on the sound data generated in step S406.

As described above, with the information processing system 2 according to the third embodiment, the ambient sound that changes according to a condition or a state of a conversation between the plurality of users in the online conference.

The information processing system 2 according to the third embodiment can output the ambient sound suitable for the interaction between the plurality of users in the online conference, by setting the sound source set, the number of sounds, the number of beats, the tone, and the melody, which are to be used for generating the sound data in step S406, in manner that the ambient sound suitable for a situation of the plurality of users in the online conference is to be output.

For example, the information processing system 2 according to the third embodiment can output the ambient sound suitable for some or all of the plurality of users who are nervous in the online conference on the assumption that the degree of tension of the participating users of the online conference is higher as the speech utterance amount and the frequency of speaker changes among the plurality of users in the online conference are larger.

The processing of steps S404 to S410 is repeated until the online conference ends. When the online conference ends, the process proceeds to step S412, and the sound output control unit 36 ends outputting the ambient sound from the output unit 102 of the information processing terminal 22.

The above-described embodiments are illustrative and do not limit the present invention. Numerous additional modifications and variations are possible in light of the above teachings. For example, elements and/or features of different illustrative embodiments may be combined with each other and/or substituted for each other within the scope of this disclosure and appended claims. The information processing systems 1 and 2 described in the above embodiments is just examples, and there may be various system configurations depending on applications or purposes.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The apparatuses or devices described in the above-described embodiment are merely one example of the plural computing environments that implement the embodiments disclosed herein. In some embodiments, the information processing apparatus 10 includes multiple computing devices, such as a server cluster. The plurality of computing devices is configured to communicate with one another via any type of communication link, including a network or shared memory to implement the processing described in the present embodiment.

Further, the information processing apparatus 10 can also combine disclosed processing steps in various ways. The components of the information processing apparatus 10 may be combined into a single apparatus or may be divided into a plurality of apparatuses. Each process performed by the information processing apparatus 10 may be performed by the information processing terminal 22. In addition, the user behavior information may be, for example, the number of users in the conference room or the heartbeat of each user.

In a related art, in a case in which an interaction between users occurs, such as in a conference, an ambient sound suitable for the interaction between the users is not output.

According to an embodiment of the present disclosure, an information processing apparatus that outputs an ambient sound suitable for an interaction between users is provided.

Any one of the above-described operations may be performed in various other ways, for example, in an order different from the one described above.

The invention claimed is:

1. An information processing system apparatus, comprising:
an information processing apparatus including circuitry;
an input device configured to measure behavior information of a plurality of users and input the behavior information to the information processing apparatus; and
an output device configured to output a sound,
the information processing apparatus, the input device, and the output device being connected to each other via a communication network, wherein
the circuitry of the information processing apparatus is configured to:
store reservation information of a scheduled conference in a memory;
determine that the plurality of users start a conversation in the scheduled conference based on the behavior information acquired from the input device;
automatically assign a melody to each of the plurality of users having the conversation in the scheduled conference based on the reservation information stored in the memory;
identify a user who speaks among the plurality of users;
determine whether the identified user speaks continuously for a predetermined time or more based on measurement by the input device; and
in response to determination that the identified user speaks continuously for the predetermined time or more, generate sound data by combining a number of sounds, a number of beats and a tone based on the behavior information and the melody assigned to the identified user, and cause the output device to output an ambient sound based on the sound data, so that the ambient sound changing according to a state of the conversation is output for the plurality of users.

2. The information processing system of claim 1, wherein the behavior information includes at least one of a speech utterance amount of the plurality of users or posture information of the plurality of users, the posture information being information in relation to postures of the plurality of users, the plurality of users being present in a space.

3. The information processing system of claim 2, wherein the behavior information includes at least one of frequency of speaker changes among the plurality of users, a screen change amount of one or more information processing terminals operated by the plurality of users, a number of users corresponding to the plurality of users, and heartbeats of the plurality of users.

4. The information processing system of claim 2, wherein the circuitry is further configured to:
acquire surroundings-dependent information that is information on surroundings of at least one of inside the space or outside the space; and
generate the sound data based on the behavior information, the melody, and the surroundings-dependent information.

5. The information processing system of claim 2, wherein the speech utterance amount of the plurality of users included in the behavior information is measured based on an output signal from a microphone.

6. The information processing system of claim 2, wherein the posture information of the plurality of users included in the behavior information is obtained based on an output signal from a camera.

7. The information processing system of claim 2, wherein the circuitry is further configured to output the ambient sound that varies depending on each of a plurality of areas of the space.

8. The information processing system of claim 1, wherein the circuitry acquires, via the communication network, the behavior information that includes a speech utterance amount of the plurality of users having the conversation.

9. The information processing system of claim 1, wherein the circuitry is further configured to determine a state of the plurality of users based on the behavior information, and cause the output device to output the ambient sound based on the state.

10. The information processing system of claim 1, wherein
the circuitry is further configured to change the sound data generated based on the behavior information as time passes in a case where a conversation time of the conversation is determined in advance.

11. The information processing system of claim 1, wherein
the output device includes at least one of a speaker provided in a space where the plurality of users are present or an information processing terminal operated by one of the plurality of users.

12. The information processing system of claim 1, wherein
the scheduled conference is an online conference in which the plurality of users respectively operate information processing terminals and the conversation occurs via a communication network connecting the information processing apparatus and the information processing terminals, and
the circuitry is further configured to:
acquire the behavior information in the online conference through the information processing terminals operated by the plurality of users, the behavior information including a speech utterance amount of the plurality of users, frequency of speaker changes among the plurality of users, and a screen change amount of the information processing terminals; and
generate the sound data based on the speech utterance amount, the frequency of speaker changes, the screen change amount, and the melody assigned to the identified user.

13. The information processing system of claim 1, wherein
the number of sounds is classified based on a speech utterance amount of at least one of the plurality of users, and
the speech utterance amount is determined by how many seconds, in a predetermined number of seconds, a state in which the at least one of the plurality of users speaks lasts.

14. The information processing system of claim 1, wherein
the number of beats is classified based on frequency of speaker changes among the plurality of users, and
the frequency of speaker changes is determined by a number of times that the speaker changes occur during a predetermined number of seconds.

15. The information processing system of claim 1, wherein
the behavior information includes posture information of the plurality of users, and
the posture information is acquired based on a posture bounding box of each of the plurality of users recognized by image processing on video data captured by the input device.

16. An information processing method using an information processing apparatus, an input device, and an output device connected to each other via a communication network, comprising:
storing reservation information of a scheduled conference in a memory of the information processing apparatus;
determining that a plurality of users start a conversation in the scheduled conference based on behavior information of the plurality of users acquired from the input device;
automatically assigning a melody to each of the plurality of users having the conversation in the scheduled conference based on the reservation information stored in the memory;
identifying a user who speaks among the plurality of users;
determining whether the identified user speaks continuously for a predetermined time or more based on measurement by the input device; and
in response to determination that the identified user speaks continuously for the predetermined time or more, generating sound data by combining a number of sounds, a number of beats and a tone based on the behavior information and the melody assigned to the identified user, and causing the output device to output an ambient sound based on the sound data, so that the ambient sound changing according to a state of the conversation is output for the plurality of users.

17. A non-transitory recording medium storing a plurality of instructions which, when executed by one or more processors for an information processing apparatus, an input device, and an output device connected to each other via a communication network, causes the processors to perform a method, the method comprising:
storing reservation information of a scheduled conference in a memory of the information processing apparatus;
determining that a plurality of users start a conversation in the scheduled conference based on behavior information of the plurality of users acquired from the input device;
automatically assigning a melody to each of the plurality of users having the conversation in the scheduled conference based on the reservation information stored in the memory;
identifying a user who speaks among the plurality of users;
determining whether the identified user speaks continuously for a predetermined time or more based on measurement by the input device; and
in response to determination that the identified user speaks continuously for the predetermined time or more, generating sound data by combining a number of sounds, a number of beats and a tone based on the behavior information and the melody assigned to the identified user, and causing the output device to output an ambient sound based on the sound data, so that the ambient sound changing according to a state of the conversation is output for the plurality of users.

* * * * *